United States Patent
Iga et al.

(10) Patent No.: US 7,147,091 B2
(45) Date of Patent: Dec. 12, 2006

(54) ONE WAY CLUTCH

(75) Inventors: Kazuo Iga, Yamatotakada (JP); Kenji Sakamoto, Kashiba (JP); Kiyoshi Tanimoto, Kashiwara (JP)

(73) Assignee: Koyo Seiko Co., Ltd., Osaka (JP)

( * ) Notice: Subject to any disclaimer, the term of this patent is extended or adjusted under 35 U.S.C. 154(b) by 6 days.

(21) Appl. No.: 10/433,511

(22) PCT Filed: Oct. 26, 2001

(86) PCT No.: PCT/JP01/09466

§ 371 (c)(1),
(2), (4) Date: Oct. 29, 2003

(87) PCT Pub. No.: WO02/103217

PCT Pub. Date: Dec. 27, 2002

(65) Prior Publication Data
US 2005/0217959 A1 Oct. 6, 2005

(30) Foreign Application Priority Data
Jun. 15, 2001 (JP) ............................ 2001-182425

(51) Int. Cl.
*F16D 41/06* (2006.01)
(52) U.S. Cl. ..................................... 192/45; 192/113.32
(58) Field of Classification Search .................. 192/45, 192/38, 113.32; 188/82.84; 384/462, 505, 384/506; 29/898.066, 898.062, 898.063
See application file for complete search history.

(56) References Cited
U.S. PATENT DOCUMENTS

| | | | | | |
|---|---|---|---|---|---|
| 1,337,634 A | * | 4/1920 | Benson | .................... | 188/82.84 |
| 2,292,988 A | * | 8/1942 | Bloomfield et al. | .......... | 192/45 |
| 2,655,813 A | * | 10/1953 | Howell | ........................ | 474/183 |
| 2,823,553 A | * | 2/1958 | Harrington | .................... | 474/91 |
| 2,823,965 A | * | 2/1958 | Harrington | .................. | 384/477 |
| 2,966,246 A | * | 12/1960 | Dodge | ........................ | 192/45.1 |
| 3,104,744 A | * | 9/1963 | Wade | ........................... | 192/45 |
| 3,198,222 A | * | 8/1965 | Bowen, III | .................. | 474/91 |
| 3,684,336 A | * | 8/1972 | Mathys | ........................ | 384/505 |
| 5,740,893 A | * | 4/1998 | Yamamoto | .................... | 192/45 |
| 5,819,899 A | | 10/1998 | Iga et al. | | |
| 2003/0117037 A1 | * | 6/2003 | Pfister | ........................ | 310/261 |

* cited by examiner

Primary Examiner—Rodney H. Bonck
(74) Attorney, Agent, or Firm—Jordan and Hamburg LLP

(57) ABSTRACT

A one-way clutch includes an outer race, wherein a plurality of windows are formed in one plate-like member, is placed so as to be relatively rotatable with respect to an inner race wherein two plate-like members overlay each other and a ball raceway surface is formed by curved portions formed in outer peripheries of the plate-like members. Balls are accommodated in the windows. The face of each of the windows on the side of the outer periphery of the outer race is formed as a cam surface wherein the distance with respect to the ball raceway surface is reduced in a circumferential direction. Urging means for urging the balls in the direction is disposed. The maximum width of the one-way clutch is equal to the ball diameter and the thicknesses of the two plate-like members constituting the inner race, so that a one-way clutch of a reduced width is obtained.

26 Claims, 23 Drawing Sheets

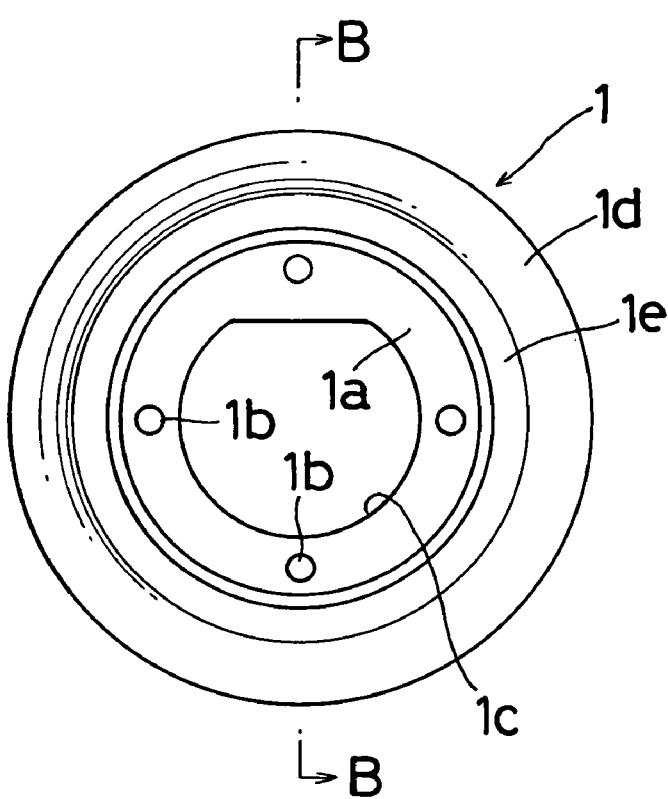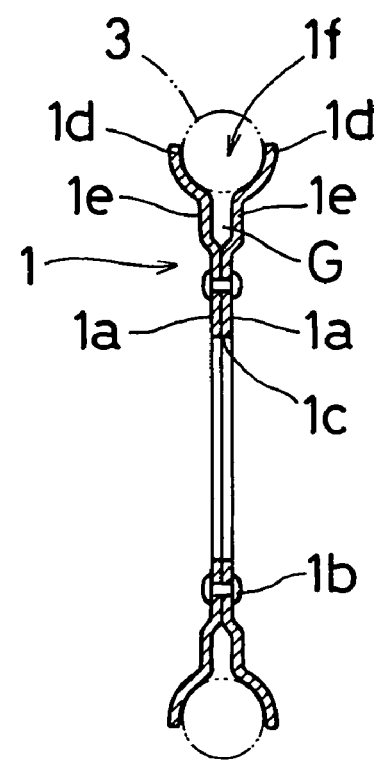

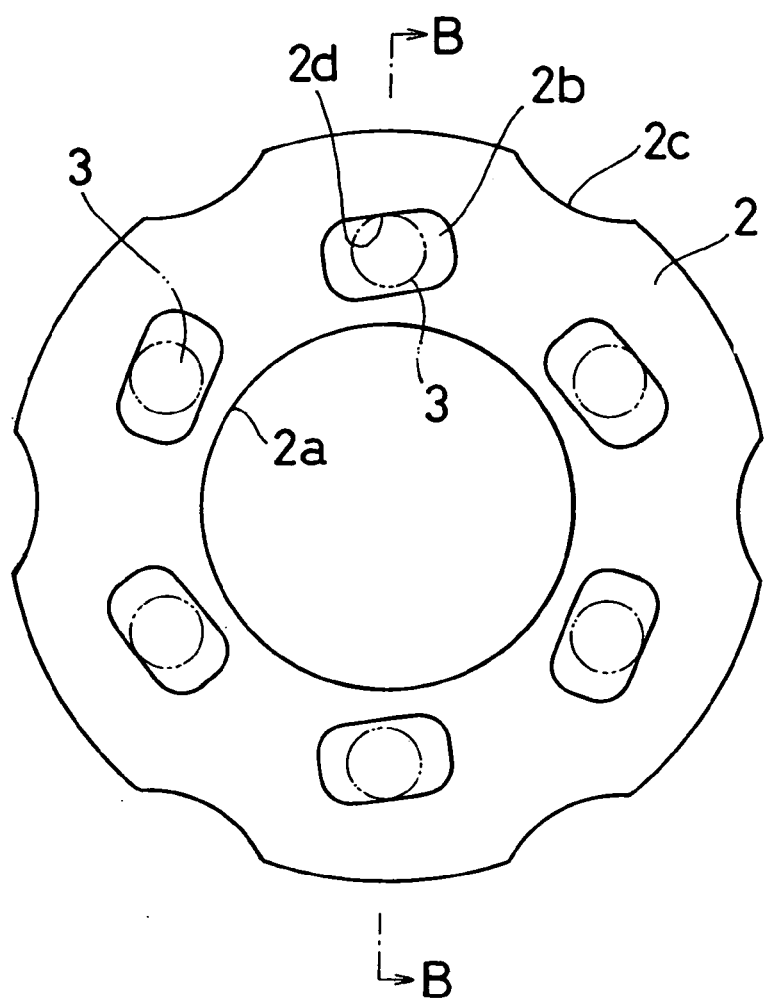
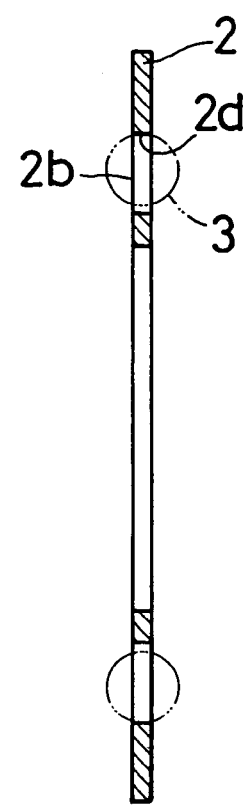
Fig.5 (A)　　　Fig.5 (B)

ONE WAY CLUTCH

BACKGROUND OF THE INVENTION

The present invention relates to a one-way clutch, and more particularly to a compact one-way clutch which has a reduced width.

As a one-way clutch which transmits relative rotation between a shaft and a housing in one direction, and which runs idle in the other direction, known is a roller clutch which is shown in a section view taken parallel to the axis of FIG. 23, and a section view taken perpendicular to the axis of FIG. 24. Such a roller clutch is often used in a reel of a fishing gear, a sheet feeding mechanism of a copying machine, and the like.

The roller clutch is configured by: an outer race 10; a shaft 11 which functions also as an inner race; a plurality of rollers 12 which are interposed between the outer race 10 and the shaft 11; a cage 13 which retains the rollers 12 at constant intervals in the circumferential direction; and springs 14 which urge the rollers 12 in respective constant directions. Flanges 10a are formed on the outer race 10. A plurality of cam surfaces 10b are formed at constant pitches on the inner face of the outer race 10. Each of the cam surfaces 10b is configured by a face in which a distance with respect to the surface of the shaft 11 is gradually reduced in a constant direction (the direction of the arrow a in FIG. 20) along the circumferential direction. Each of the rollers 12 is urged in the direction along which, under the state where the roller is retained by the cage 13 fixed to the inner side of the outer race 10, the roller between the cam surface 10b and the shaft 11 is caused by the corresponding spring 14 to bite the cam surface 10b, i.e., the direction along which the distance with respect to the shaft 11 is reduced. As a roller clutch of this kind, also a clutch of a structure in which another inner race is interposed between the roller and the shaft is known.

In the above configuration, when the shaft 11 is rotated with respect to the outer race 10 in the direction of the arrow A in FIG. 24, for example, the rollers 12 which receive the rotation force are displaced against the urging force of the springs 14, in the direction along which the distance between the cam surfaces 10b and the shaft 11 is increased, and the rollers 12 run idle with respect to the outer race 10. As a result, the rotation force of the shaft 11 is not transmitted to the outer race 10, and the shaft 11 runs idle with respect to the outer race 10. By contrast, when the shaft 11 is rotated with respect to the outer race 10 in the direction of the arrow B in FIG. 24, the rollers 12 are displaced by the rotation force and the urging force of the springs 14, in the direction along which the distance between the cam surfaces 10b and the shaft 11 is reduced, and enter between the cam surfaces 10b and the shaft 11. As a result, the rotation force of the shaft 11 is transmitted to the outer race 10, and the outer race 10 is rotated together with the shaft 11.

In the above, the example in which coil springs the number of which is equal to that of balls are used as the springs 14 for pushing the rollers 12 has been described. In consideration of the easiness of the assembling step, and the like, practically, springs having structures such as shown in FIGS. 25 and 26 are often used as the springs 14.

In the structure shown in FIG. 25, a resin-made cage 13 and an annular plate spring 14 are combined with each other. In this structure, claws 14a which enter pockets 13a of the resin-made cage 13 to push respective rollers in a constant direction along the circumferential direction are formed integrally on the plate spring 14, and caulking claws 14b are formed integrally on both the axial ends. When the caulking claws 14b are caulked, the plate spring 14 in a state where it is integrated with the resin-made cage 13 is mounted inside the outer race 10.

In the structure shown in FIG. 26, a cage and a spring are integrally formed by a resin. Claws 13b which push the rollers 12 are integrally projectingly formed in pockets 13a of the cage 13, respectively.

In such a roller clutch, because of process restrictions or the like, the rollers 12 must have a length of a certain degree or more, and hence the reduction of the overall width (the dimension in the axial direction) is inevitably limited. This is similarly applicable also to a one-way clutch in which, in place of rollers, sprags are used as power transmission members.

In the above-mentioned roller clutches, as shown in FIGS. 25 and 26, the springs for urging the rollers 12 have a complicated structure. This is a cause of an increased cost.

The above-mentioned roller clutches is not provided with means for performing positioning with respect to the shaft 11 in the axial direction. Therefore, there is a further problem in that a mechanism for positioning must be additionally disposed.

The invention has been conducted in view of such circumstances. It is an object of the invention to provide a practical one-way clutch in which the width can be reduced as compared with one-way clutches including a conventional roller clutch, means for urging power transmission members can be further simplified, it is not required to additionally dispose a mechanism for positioning in the axial direction, and, because of this also, the overall width can be largely reduced as compared with a conventional roller clutch.

BRIEF SUMMARY OF THE INVENTION

In order to attain the object, the one-way clutch of the invention is a one-way clutch which transmits relative rotation between inner and outer races in one direction only, and which runs idle in another direction, and characterized in that the one-way clutch comprises: the inner race in which two plate-like members overlay each other, and a ball raceway surface is formed by curved portions that are formed in outer edges or radially intermediate portions of the plate-like members; the outer race which is configured by a plate-like member that is placed between the two plate-like members of the inner race to be relatively rotatable with respect to the inner race, and in which a plurality of windows are formed in a circumferential direction; a plurality of balls which are accommodated in the windows of the outer race, respectively; and urging means for urging the balls in a constant direction along a circumferential direction, and a cam surface is formed on an inner face of each of the windows on a side of an outer periphery of the outer race, a distance between of the cam surface and the ball raceway surface of the inner race being gradually reduced in the direction, according to a first aspect of the invention.

A configuration, according to a second aspect of the invention, may be employed in which, in place of the plural windows formed in the outer race, a plurality of recesses are formed along an inner periphery, and a bottom face of each of the recesses is used as the cam surface in which the distance with respect to the ball raceway surface of the inner race is gradually reduced.

As the urging means which is used in the invention, a spring may be preferably used in which a plurality of claws that urge the balls in the direction, and that have elasticity are formed on an annular base member to respectively correspond to the balls, according to a third aspect of the invention. In this case, a configuration, according to a fourth aspect of the invention, may be preferably employed in which the spring is placed to overlay the outer race. In this case, a configuration, according to a fifth aspect of the invention, may be preferably employed in which the claws of the spring are bent or curved to push the balls on a center line in a width direction of the ball raceway surface of the inner race.

As a mode of the spring which is used in the invention, and which comprises the plural claws on the annular base member, a configuration, according to a sixth aspect of the invention, in which the spring is formed by one metal plate, or a configuration, according to a seventh aspect of the invention, in which the spring is formed integrally by a plate-like nonmetallic elastic material may be preferably employed.

As another mode of the urging means which is used in the invention, a spring may be used which is configured by an annular wire member, and which generates a spring force in a diameter reducing direction, and a configuration, according to an eighth aspect of the invention, may be employed in which the spring is placed to circumscribe the balls, thereby urging the balls in a direction along which the distance between the cam surface and the ball raceway surface is reduced.

As a further mode of the urging means which is used in the invention, a configuration, according to a ninth aspect of the invention, in which a gap between the ball raceway surface of the inner race and the balls is filled with viscous liquid which causes the balls to corotate during relative rotation between the inner and outer races, and the viscous liquid functions as the urging means may be employed.

In the invention, a configuration, according to a tenth aspect of the invention, may be preferably employed in which the two plate-like members forming the inner race are mutually caulked to be integrated with each other. In this case, a configuration, according to an eleventh aspect of the invention, may be employed in which a plurality of tongue pieces are formed on an inner periphery of each of the two plate-like members along a circumferential direction, each of the tongue pieces has a fastening length in the circumferential direction with respect to the tongue piece of a counter member, and the two plate-like members are mutually caulked by means of the tongue pieces. In this case, preferably, the two plate-like members have same shape and dimensions, according to a twelfth aspect of the invention.

In the invention according to any of the disclosed aspects of the invention, a configuration, according to a thirteenth aspect of the invention, may be preferably employed in which the inner race, the outer race, the balls, and the urging means are accommodated in a housing, and, among the components, the outer race and the urging means are accommodated to be nonrotatable with respect to the housing.

In order to attain the same object, the one-way clutch of the invention and of another configuration is a one-way clutch which transmits relative rotation between inner and outer races in one direction only, and which runs idle in another direction, and characterized in that the one-way clutch comprises: the outer race in which two plate-like annular members overlay each other to be integrated with each other, and a ball raceway surface is formed by curved portions that are formed in outer edges or radially intermediate portions of the annular members; the inner race which is configured by a plate-like member that is placed between the two annular members of the outer race to be relatively rotatable with respect to the outer race, and in which a plurality of windows are formed in a circumferential direction; a plurality of balls which are accommodated in the windows of the inner race, respectively; and urging means for urging the balls in a constant direction along a circumferential direction, and a cam surface is formed on an inner face of each of the windows on a side of an inner periphery of the inner race, a distance between the cam surface and the ball raceway surface of the outer race being gradually reduced in the direction, according to a fourteenth aspect of the invention.

In order to attain the same object, the one-way clutch of the invention and of a further configuration is a one-way clutch which similarly transmits relative rotation between inner and outer races in one direction only, and which runs idle in another direction, and characterized in that the one-way clutch comprises: the outer race in which two plate-like annular members overlay each other, and a ball raceway surface is formed by curved portions that are formed in outer edges or radially intermediate portions of the annular members; the inner race which is configured by a plate-like member that is placed between the two annular members of the outer race to be relatively rotatable with respect to the outer race, and in which a plurality of recesses are formed in an outer periphery; a plurality of balls which are accommodated in the recesses of the inner race, respectively; and urging means for urging the balls in a constant direction along a circumferential direction, and a cam surface is formed on a bottom face of each of the recesses, a distance between the cam surface and the ball raceway surface of the outer race being gradually reduced in the direction, according to a fifteenth aspect of the invention.

In the one-way clutch, of the disclosed fourteenth or fifteenth aspects of the invention, a configuration, according to a sixteenth aspect of the invention, may be preferably employed in which the one-way clutch is accommodated in a housing configured by a housing body, and a cover fixed to the housing body, and the two plate-like annular members that form the outer race are sandwiched between the housing body and the cover to be integrated with each other.

As the urging means in the one-way clutch, of the disclosed fourteenth to sixteenth aspects of the invention, in which the outer race is configured by the two plate-like annular members, a configuration, according to a seventeenth aspect of the invention, may be preferably employed in which a gap between the ball raceway surface of the outer race and the balls is filled with viscous liquid which causes the balls to corotate during relative rotation between the outer and inner races, and the viscous liquid functions as the urging means.

As the viscous liquid, of the disclosed seventeenth and ninth aspects of the invention, described above, grease or oil which lubricates between the ball raceway surface and the balls may be preferably, according to an eighteenth aspect of the invention, used.

As another example of the urging means in the one-way clutch, of the disclosed fourteenth to sixteenth aspects of the invention, according to a nineteenth aspect of the invention, a configuration may be employed in which a spring that is configured by an annular wire member, and that generates a spring force in a diameter increasing direction is used, and the spring is placed to inscribe the balls, thereby urging the balls in a direction along which the distance between the cam surface and the ball raceway surface is reduced.

In the invention, as power transmitting members (rolling elements) interposed between an outer race and an inner race or a shaft, rollers or sprags are not used, and instead balls are used, and, and, as the outer and inner races, plate-like members are used, whereby the intended object is attained.

In the one-way clutch, of the disclosed first to thirteenth aspects of the invention, the structure is employed wherein the inner race in which the ball raceway surface is formed by overlaying the two plate-like members in which an outer edge or a radially intermediate portion is curved, and the outer race configured by the plate-like member that is placed between the two annular members to be relatively rotatable are used, a plurality of windows are formed in the outer race, an inner face of each of the windows on an outer side forming a cam surface, the balls are placed in the windows, respectively, and the balls are pushed in the constant direction by the urging means. Therefore, the outer peripheral portion of the inner race in which the ball raceway surface is formed is the maximum-width portion, and the width of the portion is substantially equal to a total of the ball diameter and the thicknesses of the two plate-like members. The width can be considerably reduced as compared with a conventional one-way clutch using rollers or sprags which cannot be shortened to a predetermined length or shorter because of process restrictions. Since the inner race configured by the two plate-like members is fixed with respect to the shaft, positioning in the axial direction can be easily performed without additionally disposing a mechanism for fixation or the like.

In this configuration, a configuration is employed wherein a spring in which a plurality of claws corresponding to the balls are disposed on an annular base member is used as the urging means, and the balls are urged by the claws, respectively. Therefore, it is possible to obtain a practical one-way clutch in which the structure of the spring can be simplified, which can be easily assembled, and in which the width is reduced. When the spring and the outer race are overlayingly placed, they can be easily handled during a mounting process, and the mounting work can be easily conducted. In this case, when the claws are bent so as to push the balls on the center line in the width direction of the ball raceway surface of the inner race, the urging force does not act on the balls in the thrust direction, the behavior of the balls is stabilized, and therefore the operation of the one-way clutch is stabilized.

When the two plate-like members constituting the inner race are integrated with each other by mutually caulking, the structure for integration is simplified. In this case, when a structure wherein a plurality of tongue pieces are formed on the inner periphery of each of the two plate-like members along the circumferential direction, each of the tongue pieces has a fastening length in the circumferential direction with respect to the tongue piece of a counter member, and the two plate-like members are mutually caulked by means of the tongue pieces is employed, the deformation amount of a product which is required for caulking can be restricted to a minimum level. Therefore, the plate-like members can be caulked after a heat process, so that the production steps can be simplified while obtaining a necessary performance.

In the configuration in which a plurality of tongue pieces are formed on the inner periphery of each of the plate-like members, when the dimensions of the tongue pieces and recesses therebetween are adequately selected, the plate-like members can have the strictly same shape and dimensions as in the invention, of the disclosed third aspect of the invention, while the tongue pieces of the two plate-like members are mutually provided with a fastening length. Therefore, it can contribute to a reduced production cost due to decrease of the kinds of parts.

By contrast, also in the one-way clutch of the invention, of the disclosed fourteenth to sixteenth aspects of the invention, the structure is employed wherein the outer race in which the ball raceway surface is formed by overlayingly integrating the two plate-like annular members in which an inner edge or a radially intermediate portion is curved, and the inner race configured by the plate-like member that is placed between the annular members to be relatively rotatable are used, a plurality of windows in each of which an inner face on an inner side forms a cam surface, or a plurality of recesses in each of which a bottom face forms a cam surface are formed in the inner race, the balls are placed in the windows or the recesses, respectively, and the balls are pushed in the constant direction by the urging means. Therefore, the inner peripheral portion of the outer race on which the ball raceway surface is formed can be formed as the maximum-width portion, and the width of the portion is substantially equal to a total of the ball diameter and the thicknesses of the two plate-like annular members forming the outer race. The width can be considerably reduced as compared with a conventional one-way clutch using rollers or sprags which cannot be shortened to a predetermined length or shorter because of process restrictions. Since the inner race is fixed with respect to the shaft, positioning in the axial direction can be easily performed without additionally disposing a mechanism for fixation.

In the invention, of the disclosed fourteenth to sixteenth aspects of the invention, the overlaying of the two plate-like annular members in order to form the outer race includes modes which are substantially equivalent to the mode in which two annular plate-like members overlay each other, such as that in which, in place of two separate plate-like annular members, a single eyeglass-like plate members is bent at a center portion to form a two-ply structure.

In the two plate-like annular members forming the outer race, the inner edge or a radially intermediate portion is curved to form the ball raceway surface, and the outer edge can have a relatively free shape. Therefore, the integration of the two annular members can be conducted on the side of the outer edge, thereby producing an advantage that the structure for integration can be relatively freely selected.

In the one-way clutch in which the outer race is configured by the two plate-like annular members, a configuration may be employed in which the one-way clutch is accommodated in a housing configured by a housing body and a cover, and the housing body and the cover are fixed to each other under a state where the two annular members constituting the outer race are sandwiched, thereby integrating the two annular members with each other. Therefore, steps of integrating the two annular members with each other, and of fixing the housing body and the cover to each other can be simultaneously conducted, and the number of assembling steps can be reduced. When the housing body and the cover are made of a resin, for example, the fixation of the housing body and the cover can be easily conducted by ultrasonic welding, bonding, or the like. In this case, the two plate-like annular members are required only to overlay each other, and a special shape or structure for integration is not particularly required. Therefore, the shape is simple and the production is facilitated, and the configuration is suitable for miniaturization of a one-way clutch.

In the invention, of the disclosed ninth and seventeenth aspects of the invention, the gap between the ball raceway surface formed on the inner or outer race and the balls is filled with viscous liquid, and the viscous liquid is caused to function as the urging means. Because of the existence of the viscous liquid, when the inner or outer race (the raceway on the driving side) is relatively rotated with respect to the counter raceway (the raceway on the driven side), the balls always corotate with the raceway on the driving side. Namely, when the raceway on the driving side is rotated in a direction of transmitting the rotation to the raceway on the driven side, the balls corotate with the raceway on the driving side to be urged in the direction along which the distance between the ball raceway surface and the cam surface is reduced. By contrast, also when the raceway on the driving side is rotated in the opposite direction, the balls corotate with the raceway on the driving side to be urged in the direction along which the distance between the ball raceway surface and the cam surface is increased, and the raceway on the driving side surely runs idle without transmitting the rotation. According to the invention, therefore, it is not required to use springs for urging power transmitting members (rolling elements) unlike a conventional one-way clutch. Therefore, it is possible to accomplish reduction of the number of parts and that of the number of assembling steps.

In a one-way clutch in which rotation and stopping are repeated, an impact force is repeatedly applied to parts. Therefore, there is the possibility that parts of a small size and a complex shape are quickly damaged because of fatigue or the like. Since springs of a complex shape are not used, however, also the durability and the damage resistance are improved.

As in the invention, of the disclosed eighteenth aspect of the invention, when grease or oil which lubricates between the ball raceway surface and the balls is used as the viscous liquid which is to be filled into the gap between the ball raceway surface and the balls, both the urging of the balls and the lubrication of the rolling portions can be attained by viscous liquid of one kind, and this is preferable.

BRIEF DESCRIPTION OF THE DRAWINGS

Accompanying the specification are figures which assist in illustrating the embodiments of the invention, in which:

FIG. 4 is a view illustrating an inner race of the embodiment of the invention, (A) is a front view, and (B) is a section view taken along the line B—B of the figure.

FIG. 5 is a view illustrating an outer race of the embodiment of the invention, (A) is a front view, and (B) is a section view taken along the line B—B of the figure.

DETAILED DESCRIPTION OF THE INVENTION

Figure 1:
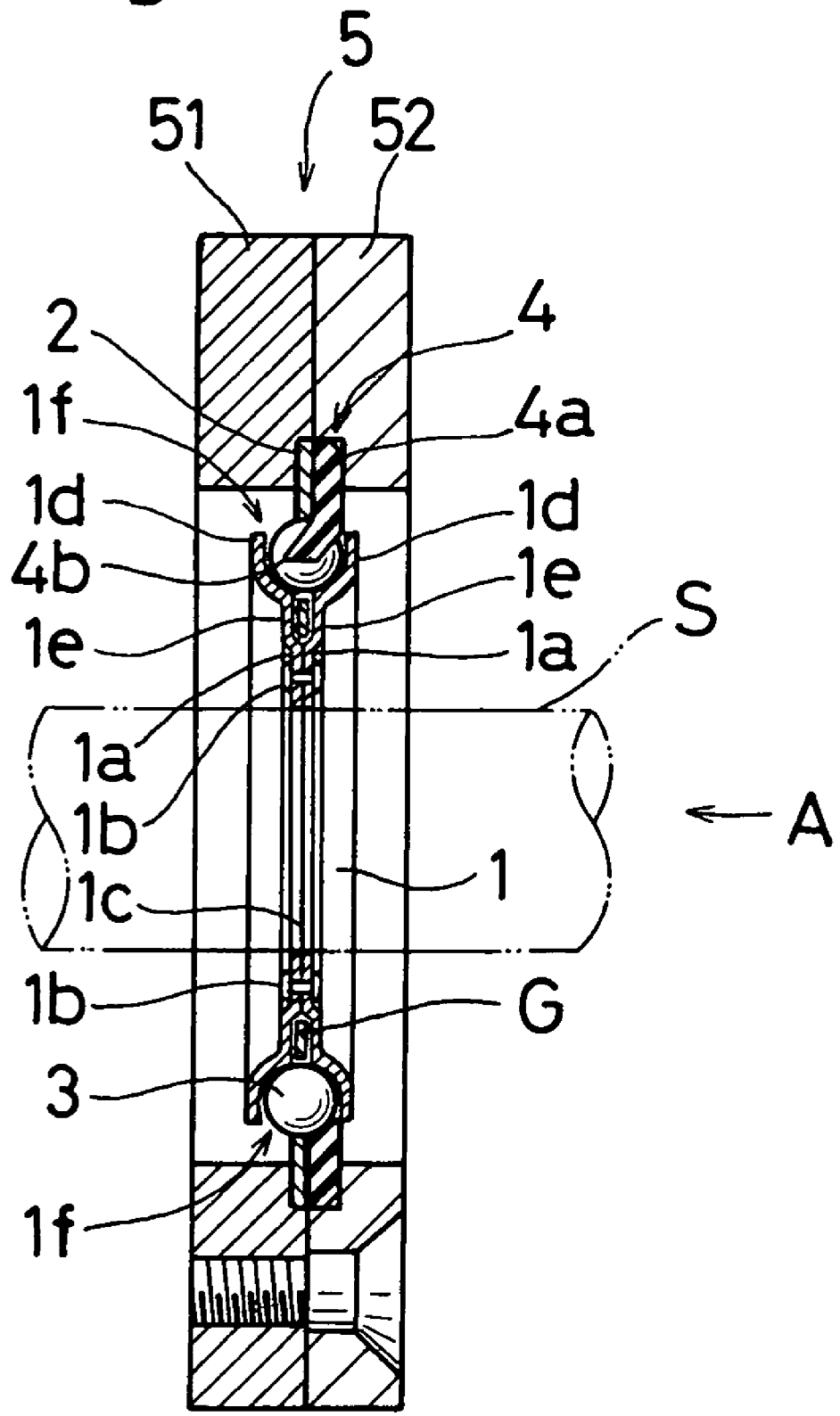
FIG. 1 is a section view taken parallel to the axis of an embodiment of the invention.

An embodiment shown in FIGS. 1 to 6 is configured by an inner race 1, an outer race 2, balls 3, a spring 4, and a housing 5.

Figure 2:
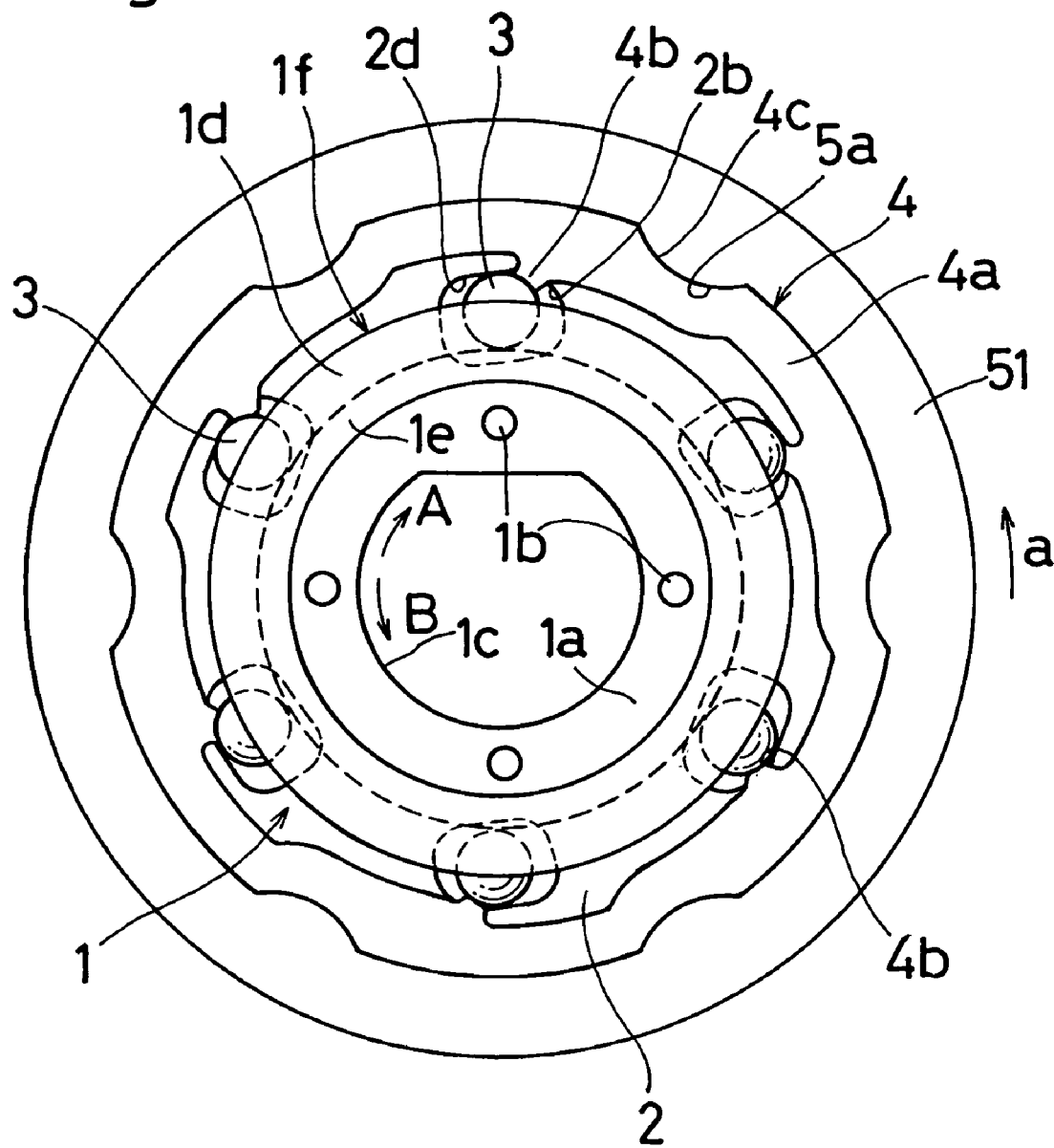
FIG. 2 is a front view of the embodiment of the invention, looking in the direction of the arrow A in FIG. 1 in a state where a housing cover is removed away.
Figure 3:
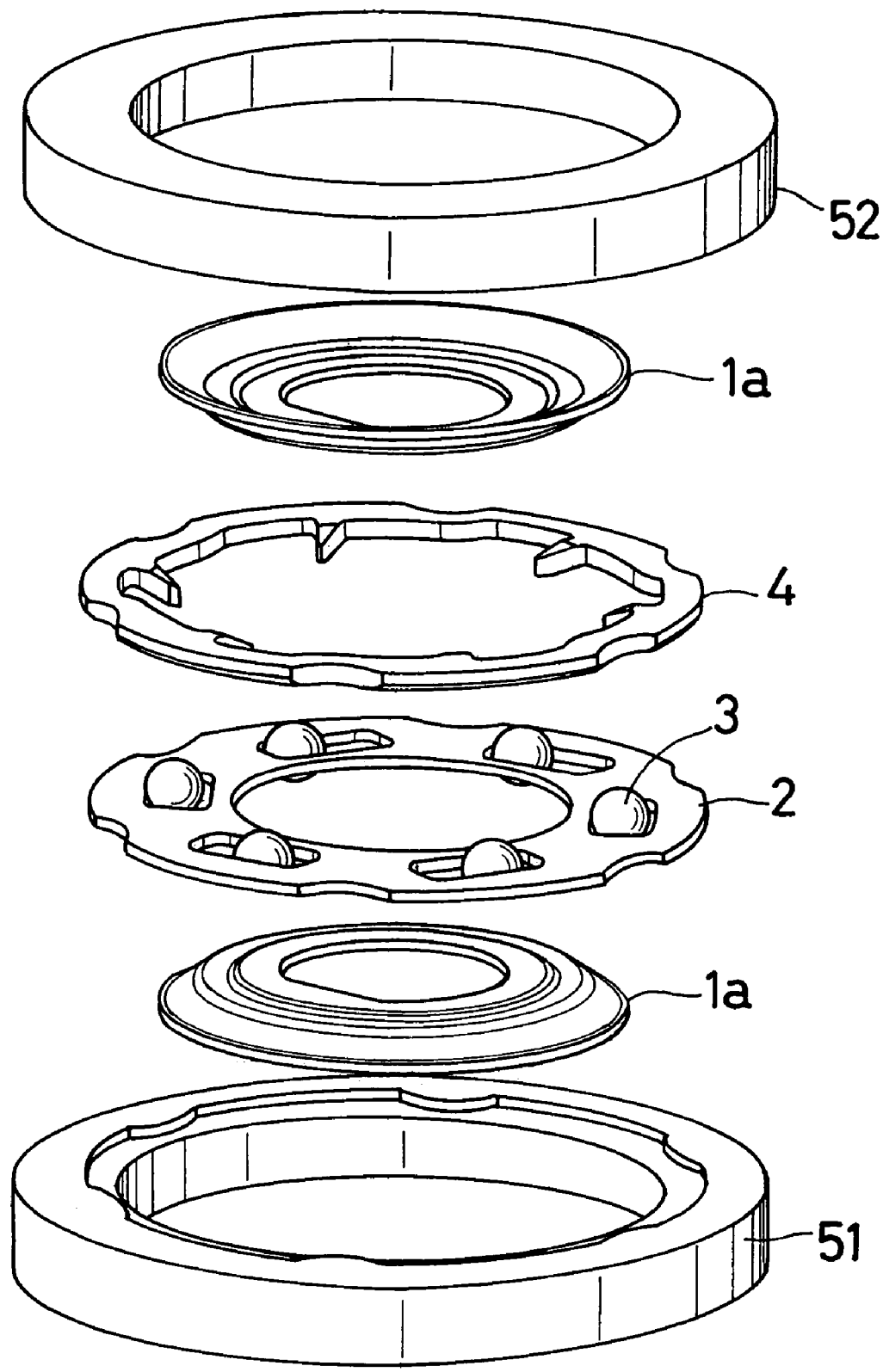
FIG. 3 is an exploded perspective view of the embodiment of the invention.

In the inner race 1, as shown in FIG. 4, two inner race plates 1a, 1a which are formed by, for example, applying punching press molding on a plate member such as a stainless steel plate overlay each other and are then fixed to each other by rivets 1b, and the inner face 1c has a D-cut shape so that, when the inner race is fixed to a shaft S, a large torque can be loaded. Curved portions 1d are formed in outer edges of the inner race plates 1a, 1a, and step portions 1e are formed on the inner peripheral side of the plates in order to form an air gap G between the inner race plates 1a, 1a in the overlaying state. As shown in FIGS. 1 and 2, a raceway surface 1f for the balls 3 is formed by curved portions 1d, 1d of the two inner race plates 1a, 1a, and the outer race 2 is inserted into the air gap G.

In the embodiment, the two inner race plates 1a, 1a are joined to each other by the rivets 1b. Alternatively, other joining means such as spot welding may be employed.

As shown in FIG. 5, the outer race 2 is similarly formed by applying punching press molding on a plate member such as a stainless steel plate, and the inner face 2a of the outer race has a circular shape. In the assembled state shown in FIGS. 1 and 2, the outer race 2 is in a state where its inner peripheral edge is rotatably fitted into the air gap G formed in the inner race 1. In the outer race 2, a plurality of windows 2b are formed on a predetermined circumference, and a plurality of recesses 2c are formed in an outer peripheral portion. In the inner face of each of the windows 2b, the inner face on the side of the outer periphery of the outer race 2 is formed as a cam surface 2d. The cam surface 2d is formed by a face in which, in the assembled state shown in FIGS. 1 and 2, the distance with respect to the raceway surface 1f of the inner race 1 is gradually reduced in the direction indicated by the arrow a in FIG. 2.

The balls 3 are installed so as to be in rolling contact with the raceway surface 1f of the inner race 1 in a state where the balls are accommodated in the windows 2b of the outer race 2, respectively.

Figure 6:
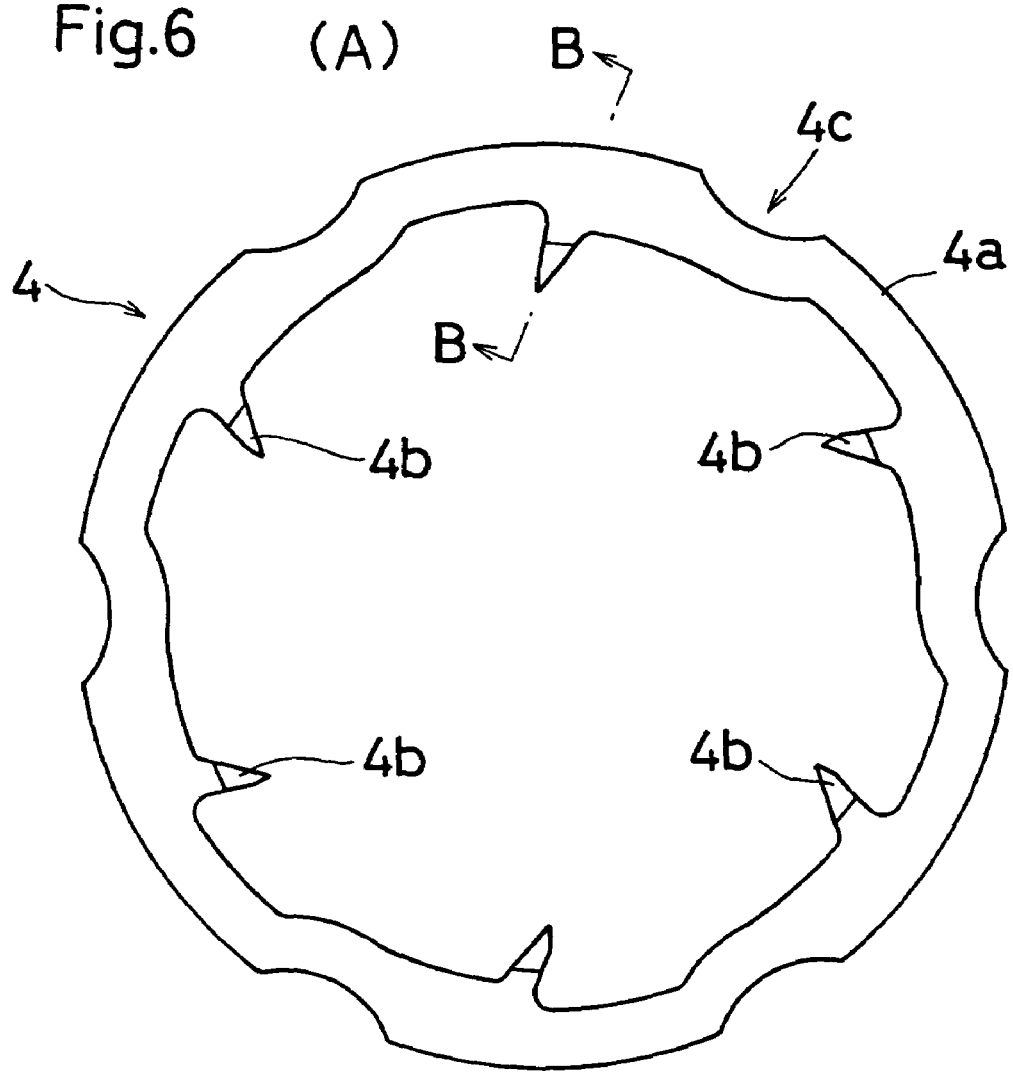
FIG. 6 is a view illustrating a spring of the embodiment of the invention, (A) is a front view, and (B) is a section view taken along the line B—B of the figure.
Figure 6:
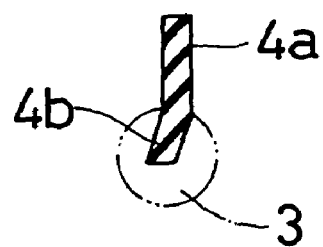

In the spring 4, as shown in FIG. 6, claws 4b which are equal in number to the balls 3 are formed integrally on a plate-like annular base member 4a. In this example, the material of the spring is rubber such as NBR. The spring 4 is incorporated in a state where the spring overlay the outer race 2, and the claws 4b are bent toward the outer race 2 so as to push the balls 3 in the windows 2b of the outer race 2 on the center line in the width direction of the raceway surface 1f of the inner race 1 in the assembled state, so that the balls 3 are urged in the direction indicated by the arrow a in FIG. 2, i.e., the direction along which the distance between the raceway surface 1f of the inner race 1 and the cam surface 2d is reduced.

Both a housing body 51 and a housing cover 52 which constitute the housing 5 have an annular shape. A plurality of protrusions 5a are formed on the inner face of the housing body 51. In the assembled state, the protrusions 5a are fitted into recesses 2c and 4c of the outer race 2 and the spring 4, thereby attaining a state where the outer race 2 and the spring 4 are accommodated nonrotatably with respect to the housing 5 in a state where the outer edges of the outer race and the spring are sandwiched between the housing body 51 and the housing cover 52.

The above-described embodiment of the invention is used in a state where the shaft S is fittingly fixed to the inner face 1c of the inner race 1. When, in the fixed state with respect to the shaft S, the shaft S and the inner race 1 are rotated in the direction indicated by the arrow A in FIG. 2, the balls 3 which are in rolling contact with the raceway surface 1f of the inner race 1 are moved by the rotation force against the urging force of the springs 4, in a direction along which the distance between the raceway surface 1f of the inner race 1 and the cam surface 2d is increased. Therefore, the balls 3 do not enter between the raceway surface 1f and the cam surface 2d, and the rotation of the inner race 1 is not transmitted to the outer race 2, with the result that the shaft S and the inner race 1 run idle with respect to the outer race 2.

By contrast, when the shaft S and the inner race 1 are rotated in the direction indicated by the arrow B in FIG. 2, a force in a direction along which the distance between the raceway surface 1f of the inner race 1 and the cam surface 2d is reduced is applied to the balls 3 by the rotation force and the urging force of the spring 4, thereby causing the balls 3 to enter between the raceway surface 1f and the cam surface 2d. In this case, therefore, the rotation of the inner race 1 is transmitted to the outer race 2.

In the above embodiment, attention should be paid on the following point. In the one-way clutch excluding the housing 5, the maximum width is in the portion where the raceway surface 1f of the inner race 1 is formed. The maximum width is substantially equal to a total of the diameter of the balls 3 and the thicknesses of the two inner race plates 1a, 1a, and can be largely reduced as compared with a conventional one-way clutch using rollers or sprags. Furthermore, positioning of the one-way clutch in the axial direction can be easily performed simply by fixing the inner race 1 to the shaft S.

Figure 21:
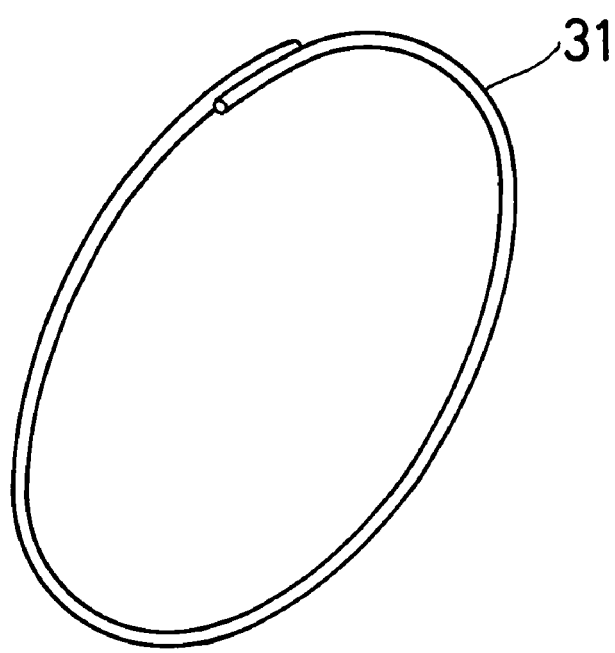
FIG. 21 is an external view of a spring serving as means for urging balls which can be used in the embodiments of the invention.
Figure 22:
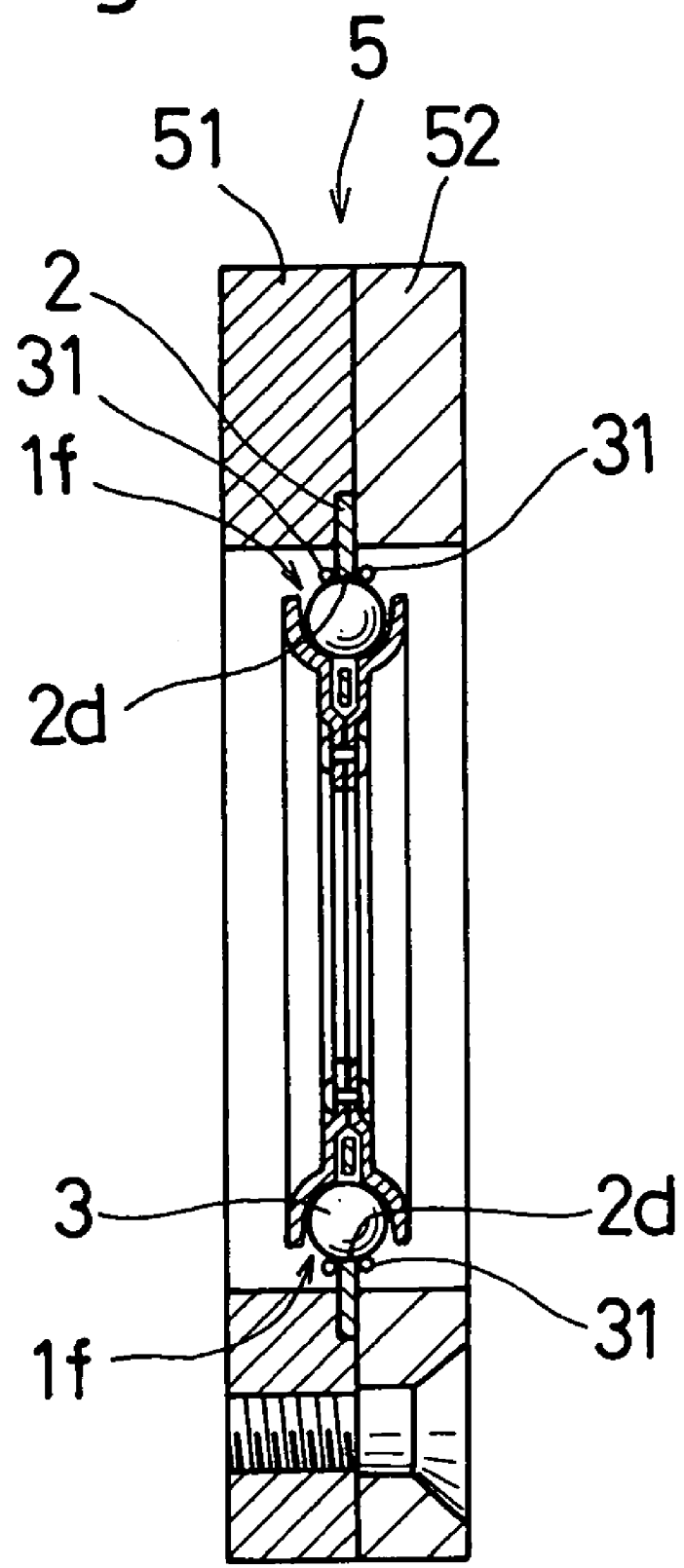
FIG. 22 is a section view taken parallel to the axis showing an example in which the spring is incorporated.

In the above embodiment, attention should be paid particularly on the following point. In the spring 4 which urges the balls 3 in the constant direction, the elastic claws 4b which are equal in number to the balls 3 are formed integrally on the plate-like annular base member 4a. As compared with a three-dimensional spring which is used in a conventional roller clutch, and which is shown in FIGS. 21 and 22, the structure can be largely simplified, and the production cost can be reduced. At the same time, with respect to the workably of assembly, it is requested only to overlay the spring with the plate-like outer race 2, and hence also the number of assembling steps can be reduced.

In the configuration in which the claws 4b are bent so as to push the balls 3 on the center line in the width direction of the raceway surface 1f of the inner race 1, a force in the thrust direction does not act on the balls 3, and the behavior of the balls can be stabilized.

Figure 7:
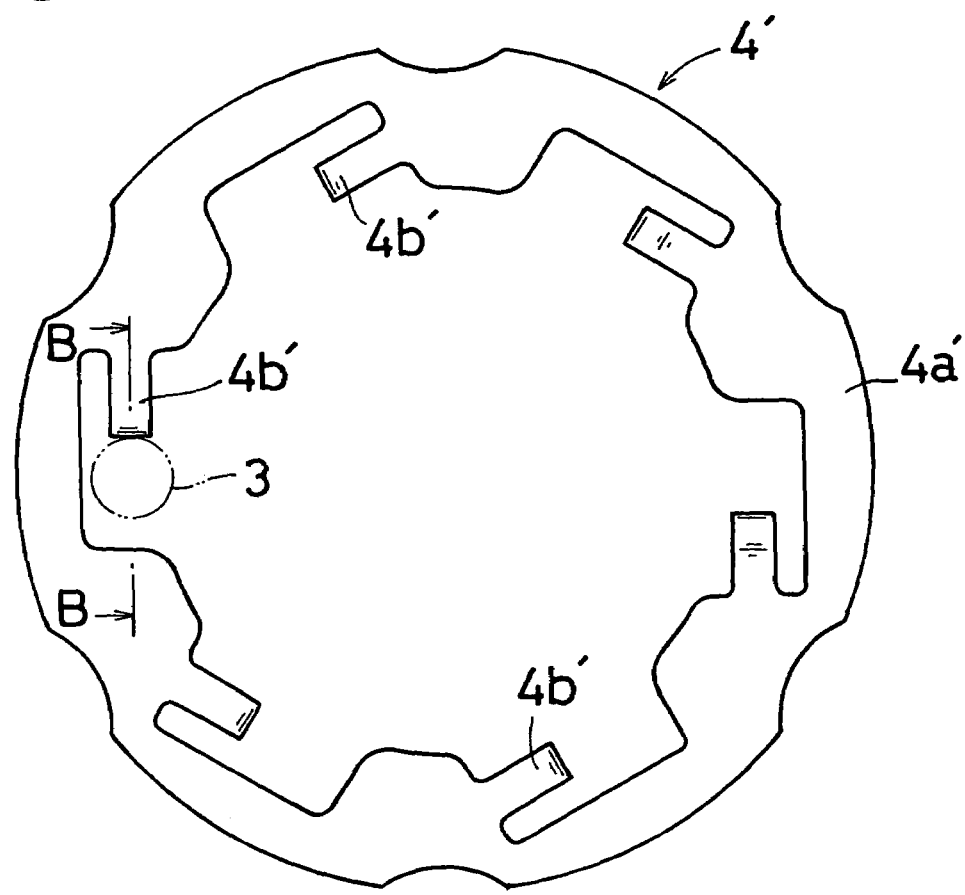
FIG. 7 is a view illustrating a case where the spring of the embodiment of the invention is configured by a plate spring made of a metal, (A) is a front view, and (B) is a section view taken along the line B—B of the figure.
Figure 7:
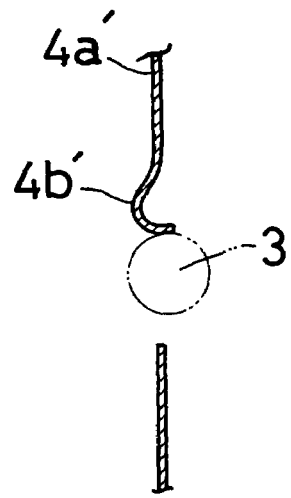
Figure 8:
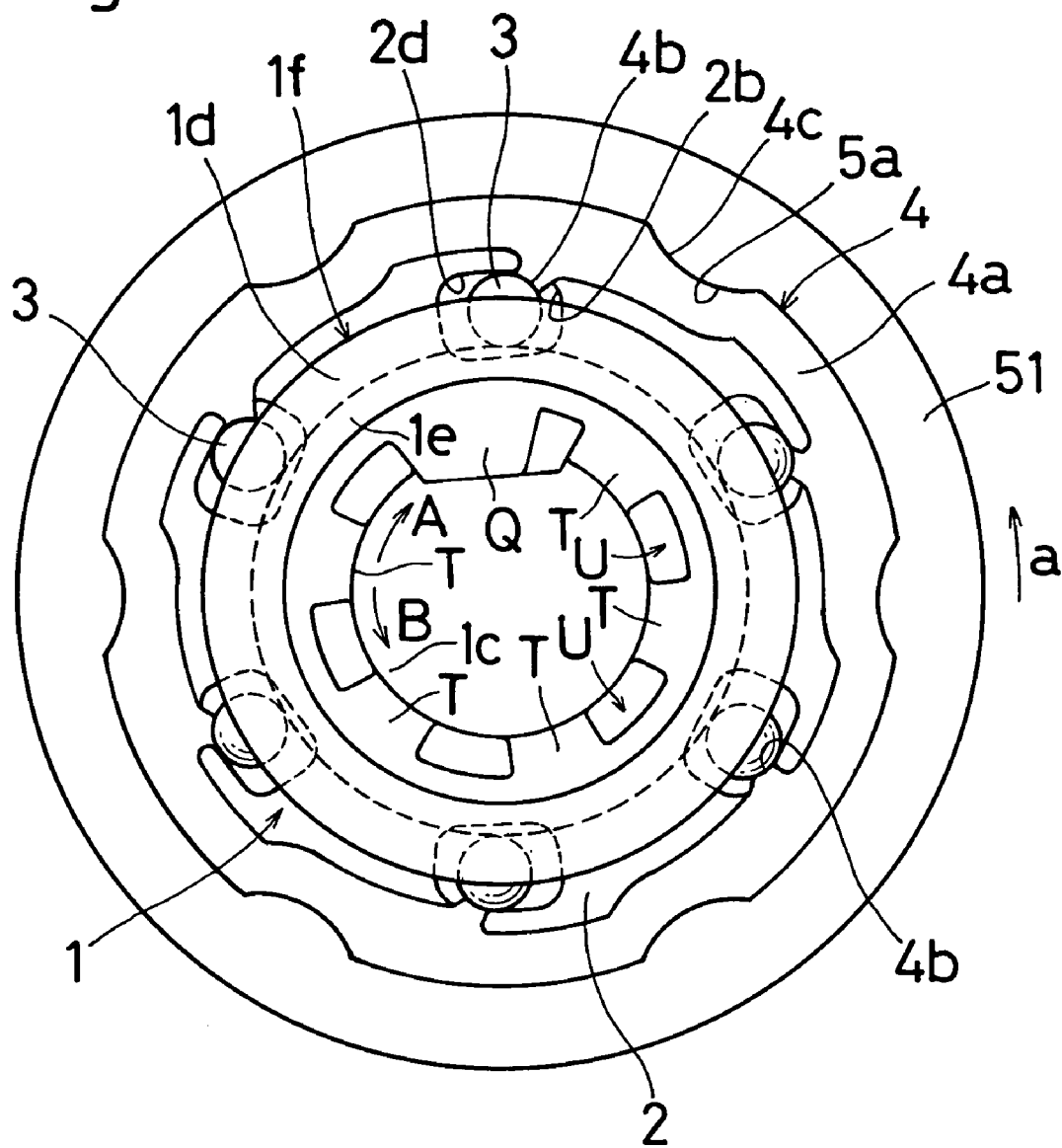
FIG. 8 is a front view of another embodiment of the invention.
Figure 9:
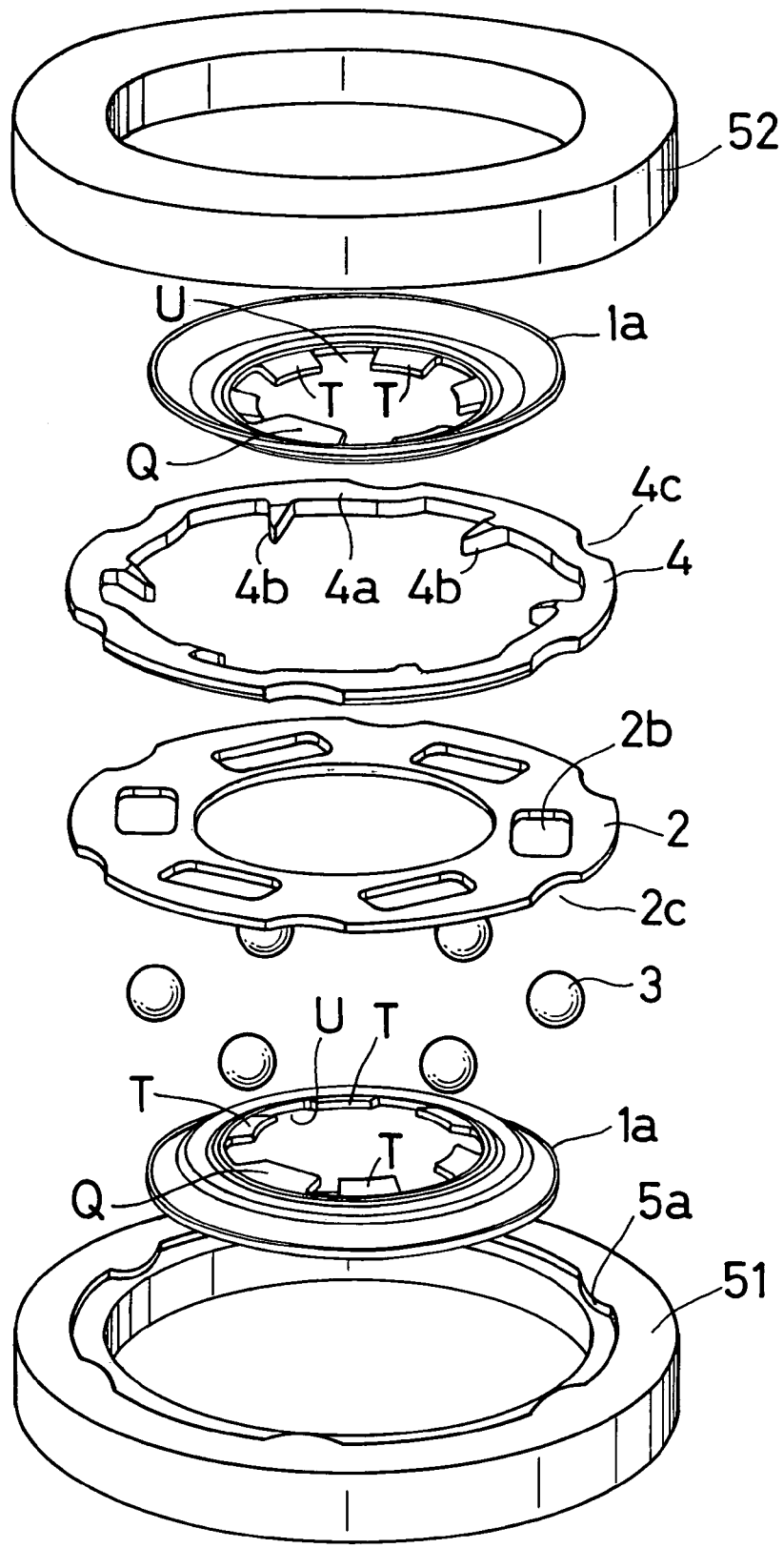
FIG. 9 is an exploded perspective view of the embodiment.
Figure 10:
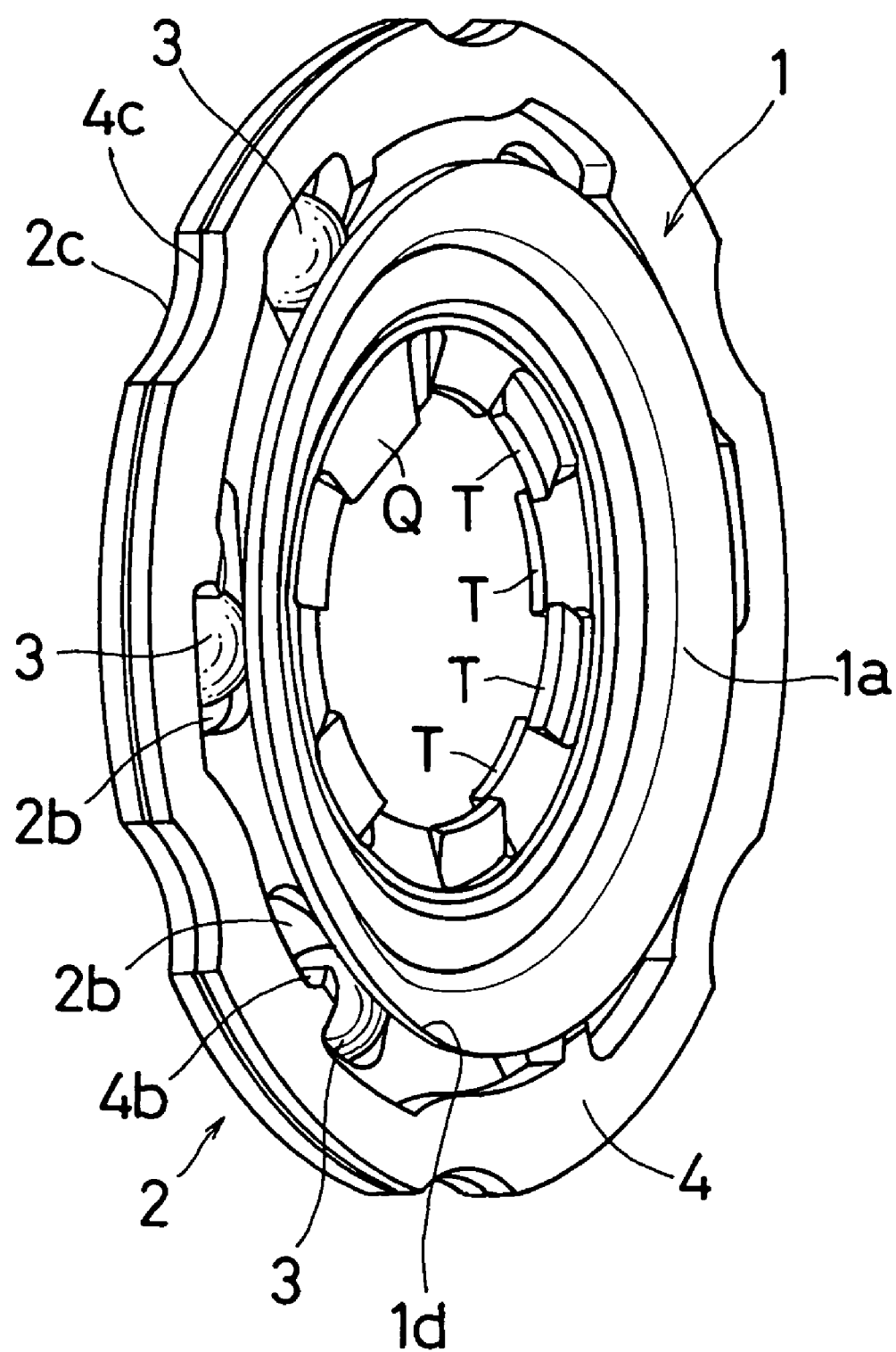
FIG. 10 is a perspective view showing an assembly of inner and outer races, balls, and a spring in the embodiment and in a state where the assembly is taken out from a housing.
Figure 11:
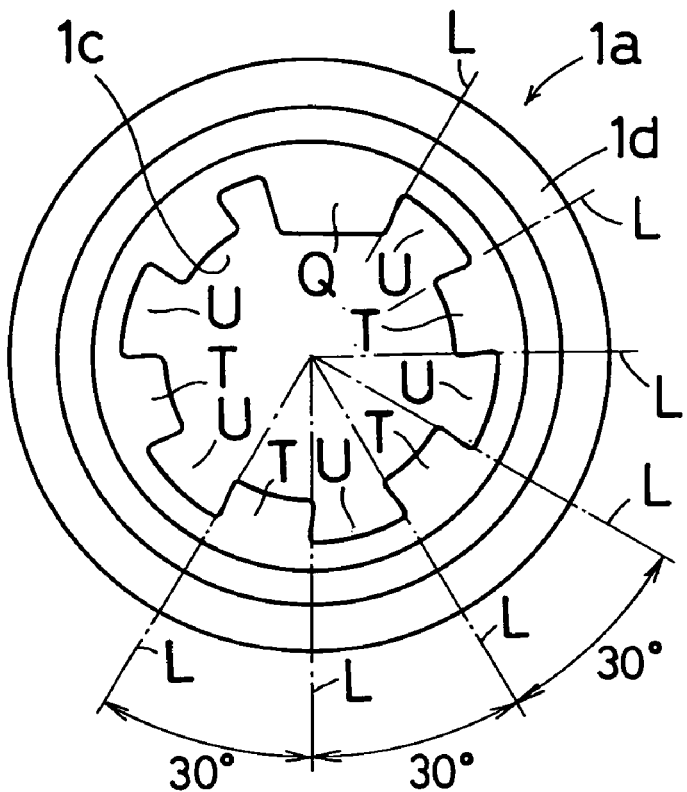
FIG. 11 is a view illustrating an inner race plate constituting the inner race of the embodiment of FIG. 8, (A) is a front view, and (B) is an enlarged view of main portions of the embodiment.
Figure 11:
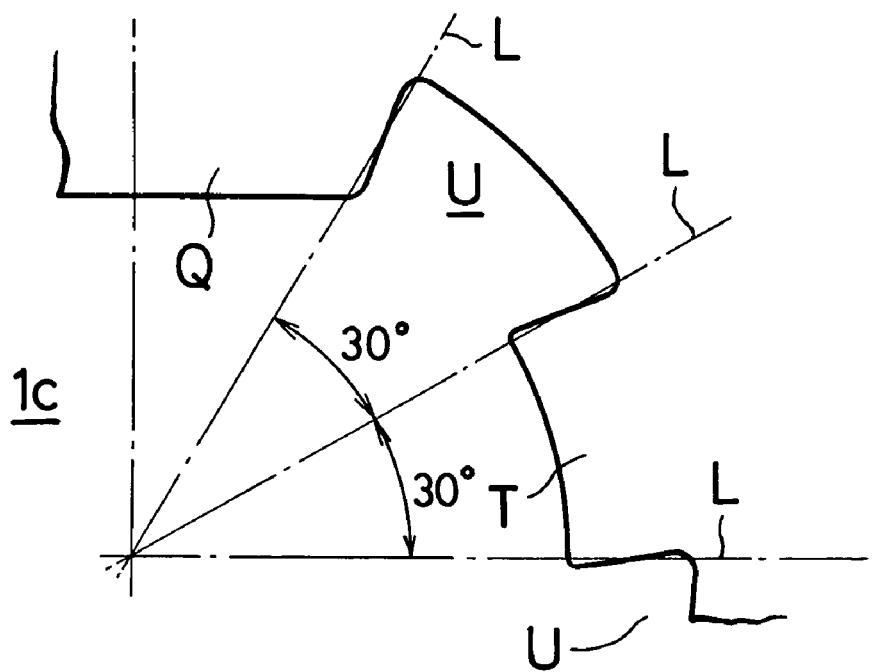

The spring which is useful in the invention is not restricted to the spring made of rubber as in that of the embodiment, and may be made of, for example, plastics. Alternatively, as exemplarily shown in FIG. 7, a plate spring made of a metal may be used. Also in the case where the metal-made plate spring 4' is used, the basic structure is similar to that of the previously described example, and claws 4b' which are equal in number to the balls 3 are formed integrally on an annular base member 4a'. The spring can be produced by, for example, press molding. Since a metal-made plate is high in strength and corrosion resistance, there is an advantage that the spring has excellent durability. Also in the case where the metal-made spring is used, the tip ends of the claws 4b' are preferably curved or bent so that the balls can be pushed on the center line in the width direction of the raceway surface of the inner race.

In the above embodiment, the example in which the two inner race plates 1a constituting the inner race 1 are integrated with each other by using the rivets 1b has been described. Alternatively, the two inner race plates 1a can be integrated with each other by caulking the plates without using members for integration such as the rivets 1b. An example of such a case will be described with reference to FIGS. 8 to 11.

In the example, the members other than the inner race 1 are equivalent to those of the above-described example. Therefore, the equivalent members are denoted by the same reference numerals, and their detailed description is omitted.

In the inner race 1 of the example, in the same manner as the above-described example, two inner race plates 1a, 1a which are formed by, for example, applying punching press molding on a plate member such as a stainless steel plate overlay each other, and are then mutually caulked to be integrated with each other by using tongue pieces T formed on the inner periphery 1c. In the same manner as the above-described example, the whole shape of the inner periphery 1c has a D-cut shape so that, when the inner race is fixed to the shaft S, a large torque can be loaded.

The two inner race plates 1a, 1a constituting the inner race 1 are members which have the same shape and dimensions. In the example, as shown in FIG. 8(A), five tongue pieces T are formed on the inner periphery 1c along the circumferential direction. The tongue pieces T are alternately formed together with recesses U interposed therebetween, at intervals and widths of 30E in the circumferential direction. As shown in FIG. 8(B), with respect to lines L which are positioned in boundaries between the tongue pieces T and the recesses U at intervals of 30E, a tip end portion of each of the tongue pieces T is slightly projected toward the recesses U on both the sides, and a basal end portion of each of the recesses U is slightly projected toward the tongue pieces T on both the sides.

According to the above-described configuration, when the two inner race plates 1a, 1a overlay each other with being opposedly faced each other so that the tongue pieces T are opposed to the recesses U, the tongue pieces T of the inner race plates 1a have a fastening length in both the sides. In the overlaying state, the tip end portions of the tongue pieces T of both the inner race plates 1a, 1a are deformed so as to be bent toward the counter member, thereby attaining a state where the tongue pieces T having the fastening length are mutually caulked. Therefore, the two inner race plates 1a, 1a are integrated with each other, and the inner race 1 is formed. In the figure, Q denotes a portion for forming the linear portion in the D-cut shape of the inner periphery 1c. The portion Q is not deformed to attain a mutually closely contacted condition in the state where the two inner race plates 1a, 1a overlay each other.

In the example, attention should be paid particularly on the following point. The inner race plates 1a, 1a which are the two plate-like members constituting the inner race 1 are caused to enter the state where the inner race plates 1a, 1a are mutually coupled and integrated with each other, simply by slightly deforming the tip end portions of the tongue pieces T formed on the inner periphery 1c of each plate, and caulking the pieces in the state where the plates overlay each other with being opposedly faced each other. As compared with a case where other coupling means such as screws, rivets, or welding is used, the workability is satisfactory. Furthermore, the deformation amount of the inner race plates 1a which is required for caulking can be restricted to a minimum required level. Therefore, the inner race plates 1a can be caulked after a heat process, so that the inner race 1 after integration has high hardness, and the accuracy is in a state where a high accuracy is maintained without lowering the working accuracy of the inner race plates 1a.

Since the two inner race plates 1a can have the same shape and dimensions, the production cost can be suppressed to a low level. In the invention, however, the two inner race plates 1a may have different shape and dimensions in particular portions. Moreover, the structure for mutually caulking the two inner race plates 1a is not restricted to the above-described one in which the tongue pieces T are projected from the inner periphery 1c. A structure for caulking may be disposed at an arbitrary position where the function of a one-way clutch is not impaired.

The windows 2c of the outer race 2 in the embodiments described above are not restricted to the configuration in which the windows are distributed equally in the circumferential direction. It is a matter of course that the positions of the windows 2c in the circumferential direction can be arbitrarily determined as far as the function is not impaired.

In the embodiments described above, the ball raceway surface is formed by disposing the curved portions in outer edges of the two plates constituting the inner race. Alternatively, the curved portions may be disposed in radially intermediate portions (on the side of the inner periphery with respect to the outer edge) of the plates.

Figure 12:
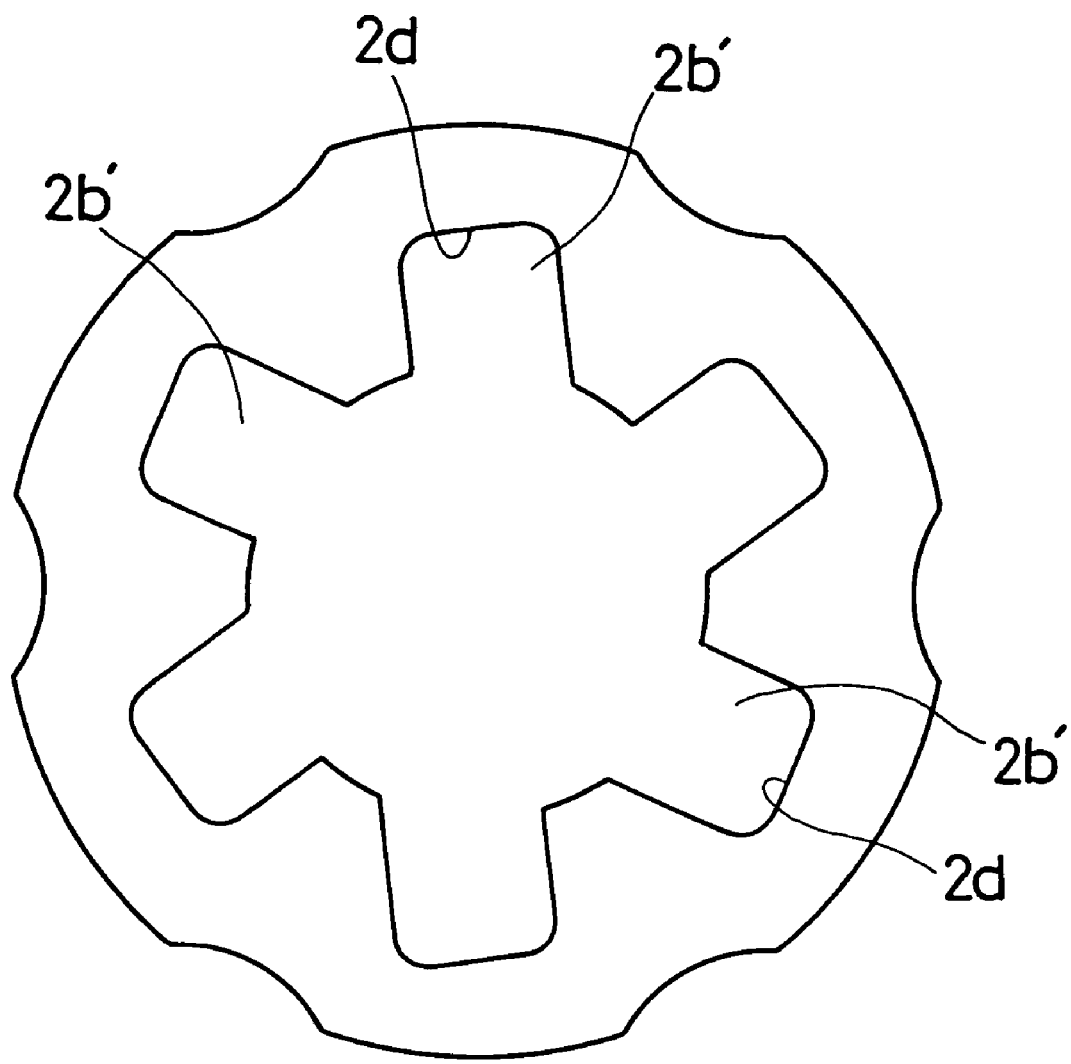
FIG. 12 is a front view showing another example of the configuration of the outer race which can be used in the embodiments.

In the above embodiment, the example in which the windows are disposed in the outer race and the inner face of each of the windows on the side of the outer periphery of the outer race is used as a cam surface has been described. Alternatively, as shown in FIG. 12, a plurality of recesses 2b' may be formed along the inner periphery of the outer race, and the cam surface 2d may be formed on the bottom face of each of the recesses 2b'.

Next, a further embodiment of the invention will be described with reference to FIGS. 13 to 19.

This example is characterized in that an inner race 21 is configured by one plate-like member and the outer race 2 has a structure in which two outer race plates 22a overlay each other.

Figure 15:
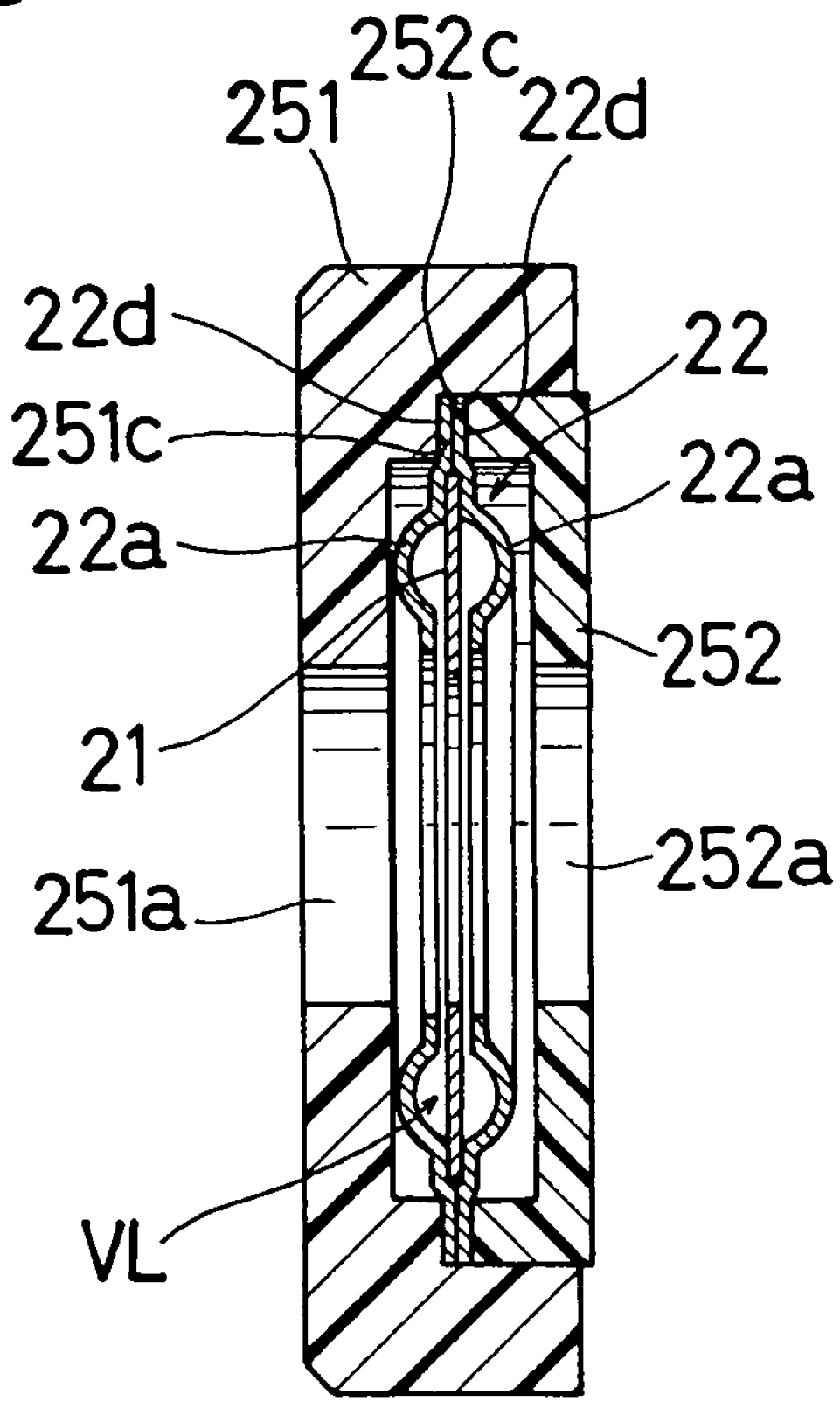
FIG. 15 is a section view taken along the line B—B of FIG. 14.

As shown in FIG. 15, the inner race 21 is formed by, for example, applying punching press molding on a plate member such as a stainless steel plate. A plurality of windows 21a are formed in a plate-like annular member of a uniform thickness. The outer face 2b of the inner race has a circular shape, and the inner face 21c has a D-cut shape so that, when the inner race is fixed to the shaft S, a large torque can be loaded.

Figure 16:
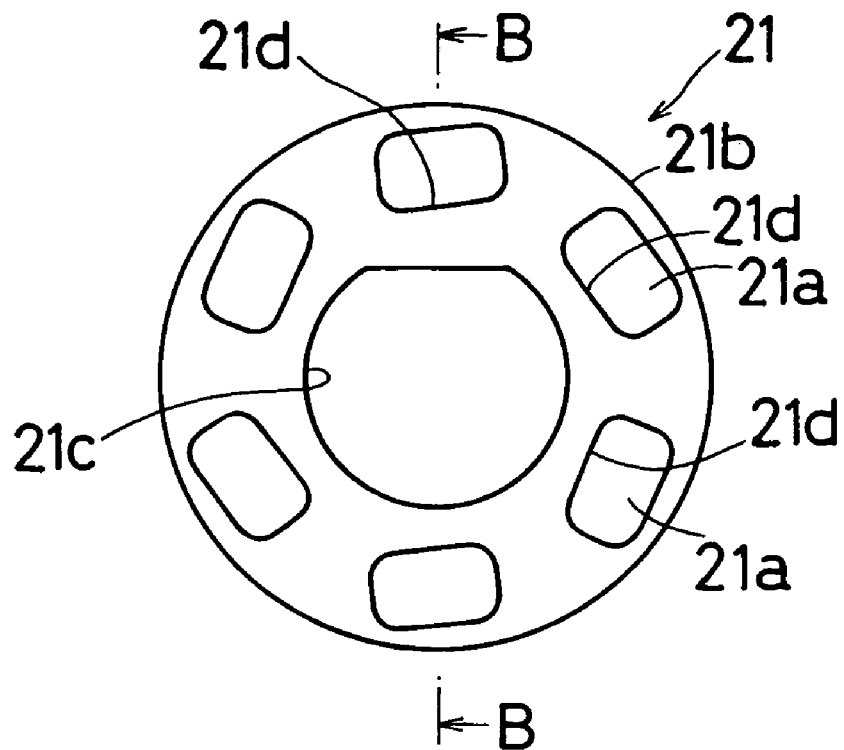
FIG. 16 is a view illustrating an inner race of the embodiment of FIG. 13, (A) is a front view, and (B) is a section view taken along the line B—B of the figure.
Figure 16:
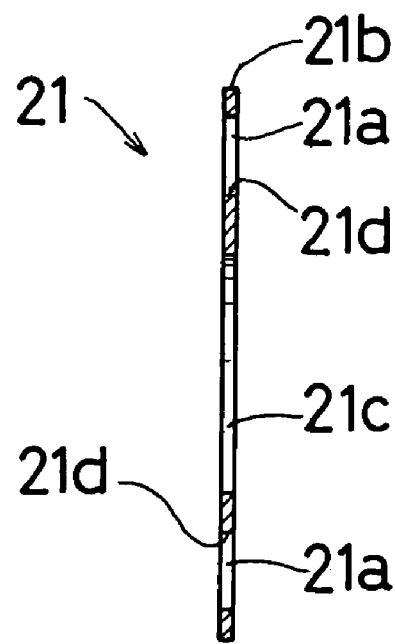
Figure 17:
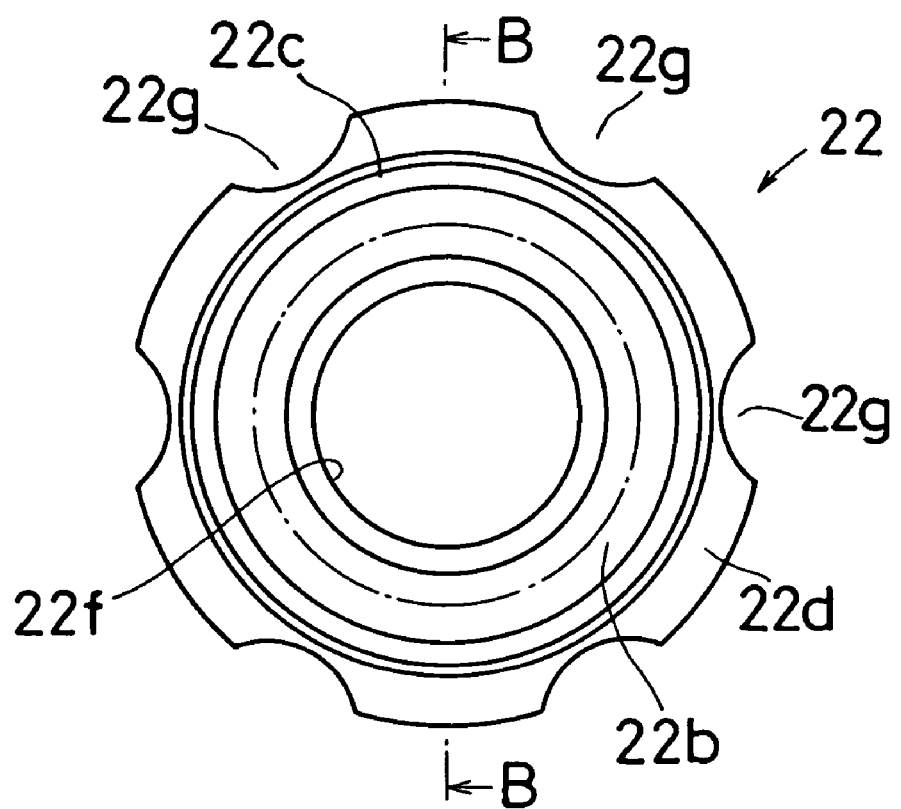
FIG. 17 is a view illustrating the outer race of the embodiment of FIG. 12, (A) is a front view, and (B) is a section view taken along the line B—B of the figure.
Figure 17:
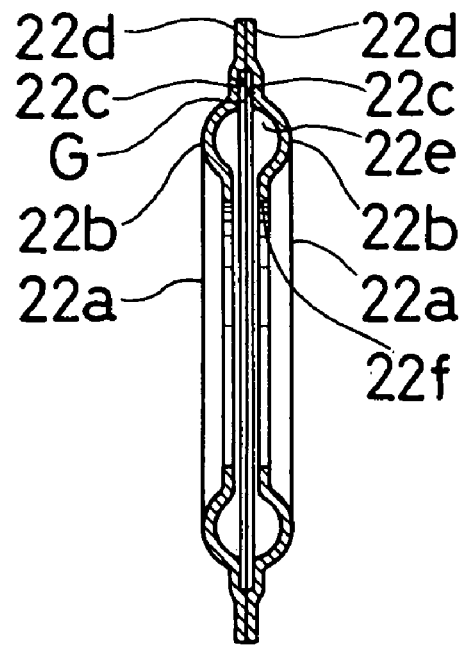

In the outer race 22, as shown in FIG. 16, similarly, two outer race plates 22a, 22a which have the same shape and dimensions, and which are plate-like annular members that are formed by applying punching press molding on a plate member such as a stainless steel plate are integrated by overlaying each other with being opposedly faced each other.

Curved portions 2b are formed in radially intermediate portions of each of the outer race plates 22a, and step portions 22c are formed on the outer peripheral side of the plates in order to form an air gap G between the outer race plates 22a, 22a in the overlaying state. The air gap G formed between the outer race plates 22a, 22a elongates to the inner periphery side across the curved portions 22b.

A flat portion 22d is formed on the outer peripheral side of each of the step portions 22c. In a state where the two outer race plates 22a, 22a overlay each other, the flat portions 22d are closely contacted with each other, and a raceway surface 22e for the balls 23 is formed by the curved portions 22b, 22b. The inner race 21 is mutually rotatably inserted into the air gap G. The inner faces 22f of the outer race plates 22a, 22a have as circular shape, and a plurality of recesses 22g are formed in an outer peripheral portion.

The raceway surface 22e of the outer race 22 is formed at a degree in which the balls 23 are substantially embraced except the air gap G formed in the outer and inner peripheral sides. The curvature of the raceway surface 22e is slightly larger than that of the balls 23, so that an appropriate gap is formed between the raceway surface and the balls 23. The gap between the balls 23 and the raceway surface 22e is filled with viscous liquid VL which lubricates between them and urges the balls 23 as described later. As the viscous liquid VL, grease, or oil having adequate viscosity is useful.

In each of the windows 21a of the inner race 21, the inner face on the side of the outer periphery of the inner race is formed as a cam surface 21d. The cam surface 21d is formed by a face in which, in the assembled state shown in FIGS. 12 to 14, the distance with respect to the raceway surface 22e of the outer race 22 is gradually reduced in the direction indicated by the arrow R in FIG. 13.

The balls 23 are installed so as to be in rolling contact with the raceway surface 22e of the outer race 22 in a state where the balls are accommodated in the windows 21a of the inner race 21, respectively.

Figure 18:
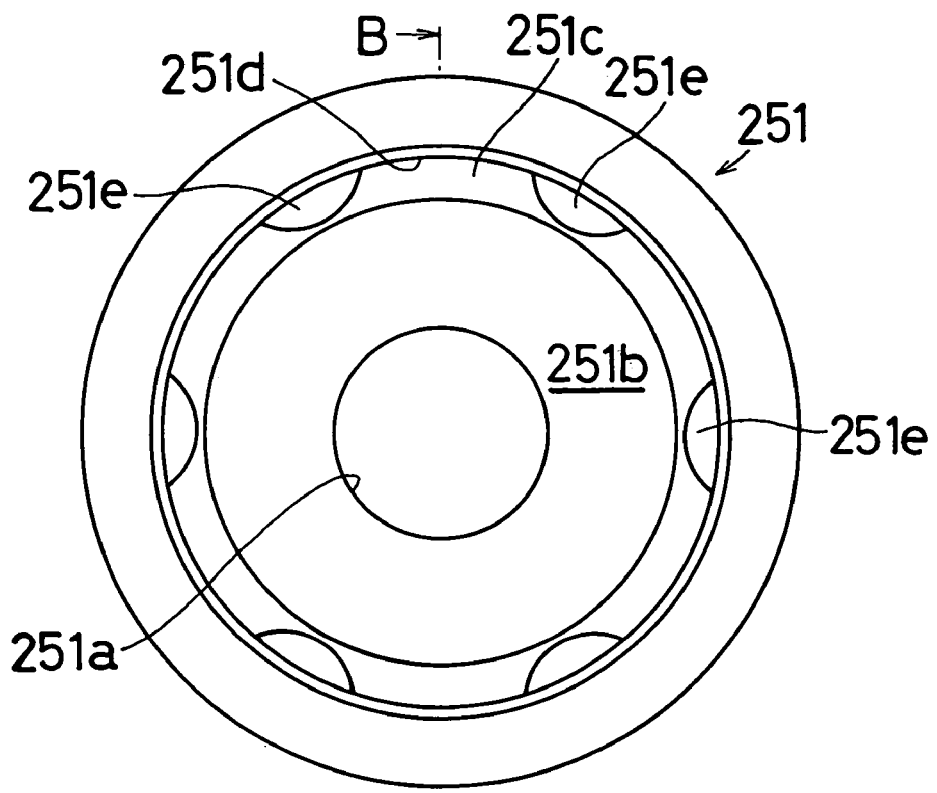
FIG. 18 is a view illustrating a housing body of the embodiment of FIG. 13, (A) is a front view, and (B) is a section view taken along the line B—B of the figure.
Figure 18:
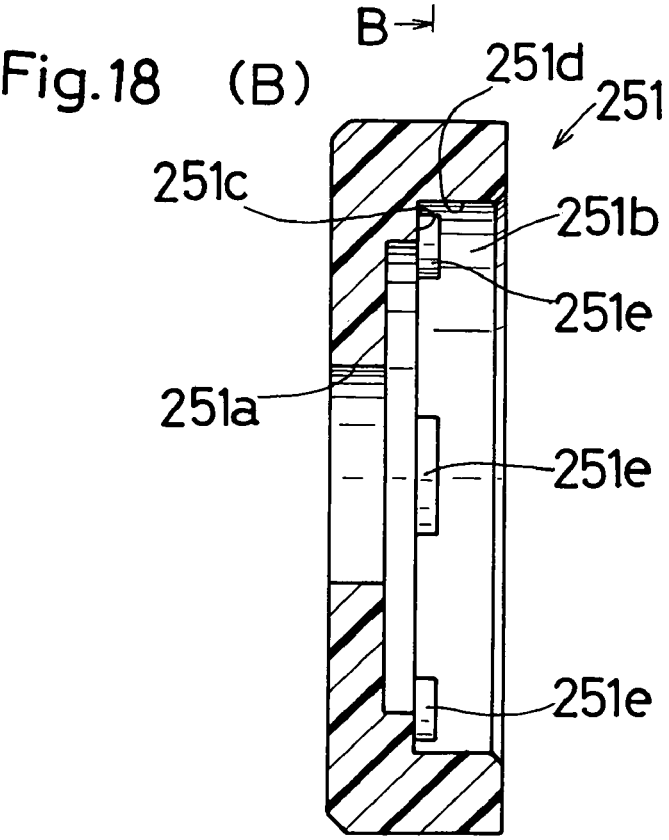
Figure 19:
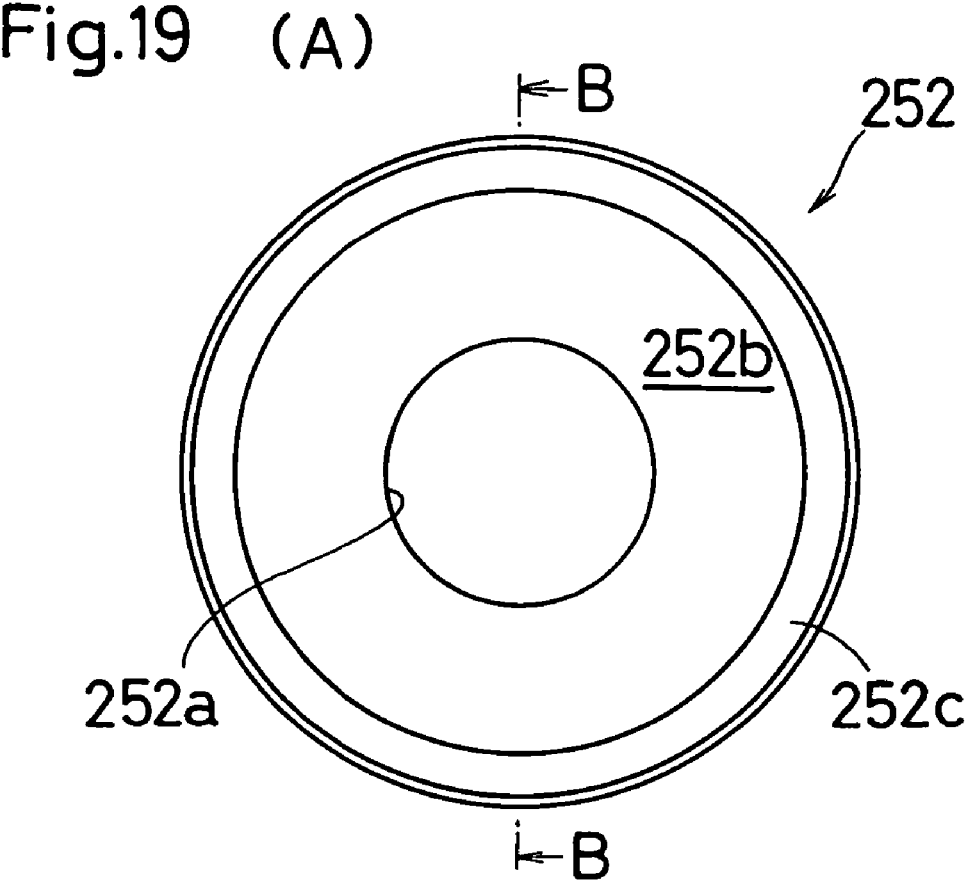
FIG. 19 is a view illustrating a cover of the embodiment of FIG. 13, (A) is a front view, and (B) is a section view taken along the line B—B of the figure.
Figure 19:
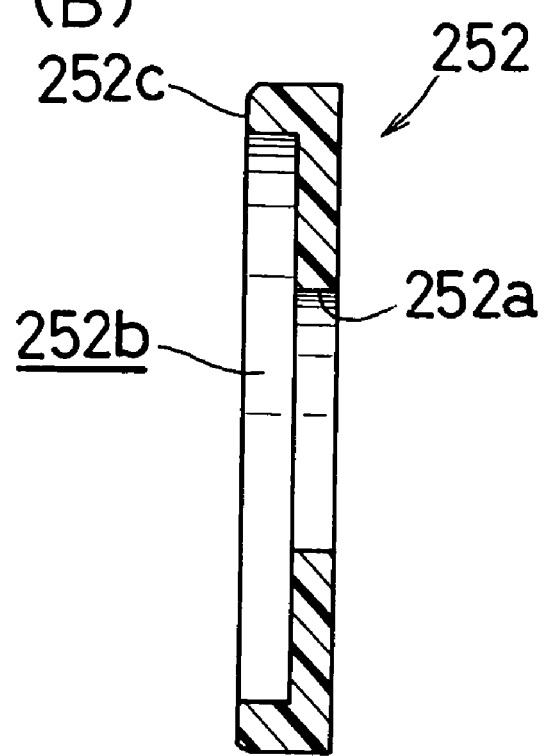

A housing 25 is configured by a housing body 251 and a cover 252 which are molded products of resin such as polyacetal. FIGS. 18 and 19 show the shapes of the housing body 251 and the cover 252, respectively. In the figures, (A) is a front view, and (B) is a section view taken along the line B—B.

Both the housing body 251 and the cover 252 have an annular shape as a whole. Holes 251a and 252a through which the shaft S is to be passed are formed in their center portions, respectively. In the housing body 251 and the cover 252, recesses 251b and 252b for accommodating the above-described assembly of the inner race 21, the outer race 22, and the balls 23 are formed in end faces which are to butt against each other. In the cover 252, a flat portion 252c is formed on the side of the outer periphery with respect to the recess 252b. In the housing body 251, a step portion 251c is formed on the side of the outer periphery of the recess 251b. The outer face of the cover 252 is inserted to the inner face 251d outside the step portion 251c. A plurality of protrusions 251e which are projected in the axial direction are formed on the step portion 51c. In the assembled state, the protrusions 251e are fitted into the recesses 22g formed in the outer periphery of the outer race 22.

When the cover 252 is placed under this state, a state is obtained in which the outer race 22 is sandwiched in the formation position of the flat portion 22d of the outer peripheral portion, between the step portion 251c of the housing body 251 and the flat portion 252c of the cover 252 (see FIG. 14), and the flat portion 252c of the cover 252 butts against the surfaces of the protrusions 251e of the housing body 251 (see FIG. 12).

The fixation of the cover 252 to the housing body 251 is performed by ultrasonic welding the butting faces between the flat portion 252c of the cover 252 and the protrusions 251e of the housing body 251. In the state where the cover 252 is fixed to the housing body 251, the two outer race plates 22a, 22a forming the outer race 22 are sandwiched between the step portion 251c of the housing body 251 and the flat portion 252c of the cover 252, whereby the plates are integrated with each other and also with the housing 5.

The above-described embodiment of the invention is used in a state where the inner face 21c of the inner race 21 is fittingly fixed to the shaft S. When, in the state the inner race 21 is fixed to the shaft S, the outer race 22 and the housing 25 are rotated with respect to the shaft S and the inner race 21 in the direction indicated by the arrow F in FIG. 13, the balls 23 which are in rolling contact with the raceway surface 22e of the outer race 22 are corotated and moved by the viscosity resistance of the viscous liquid VL configured by grease or oil filled between the balls 23 and the raceway surface 22e, in the same direction as the outer race 22, i.e., the direction indicated by the arrow F. Along the direction indicated by the arrow F, the distance between the raceway surface 22e of the outer race 22 and the cam surface 21d is increased. Therefore, the balls 23 do not enter between the raceway surface 22e and the cam surface 21d, and the rotation of the outer race 22 is not transmitted to the inner race 21 and the shaft, with the result that the outer race 22 and the housing 25 run idle with respect to the inner race 21 and the shaft S.

Figure 13:
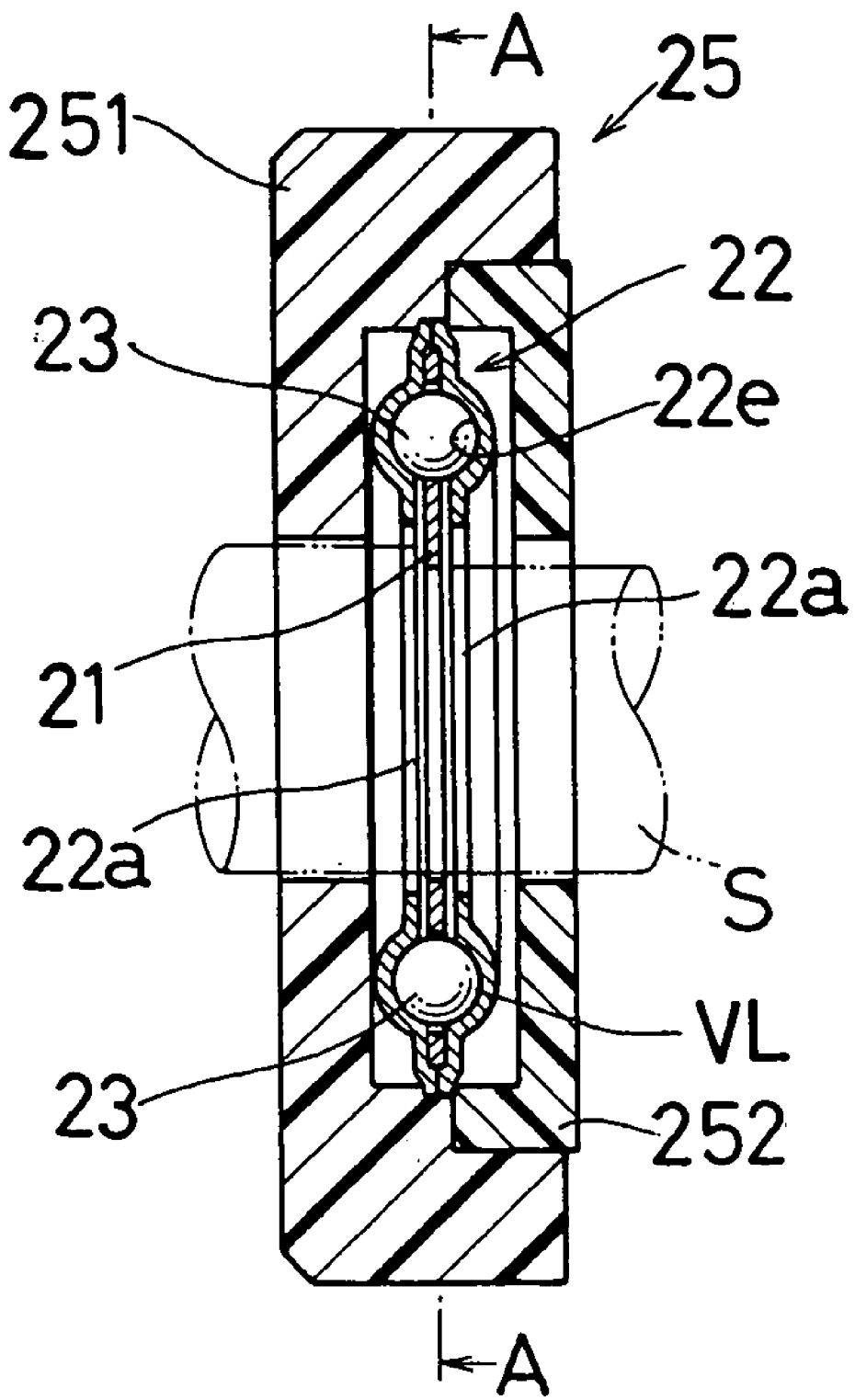
FIG. 13 is a section view taken parallel to the axis of a further embodiment of the invention.
Figure 14:
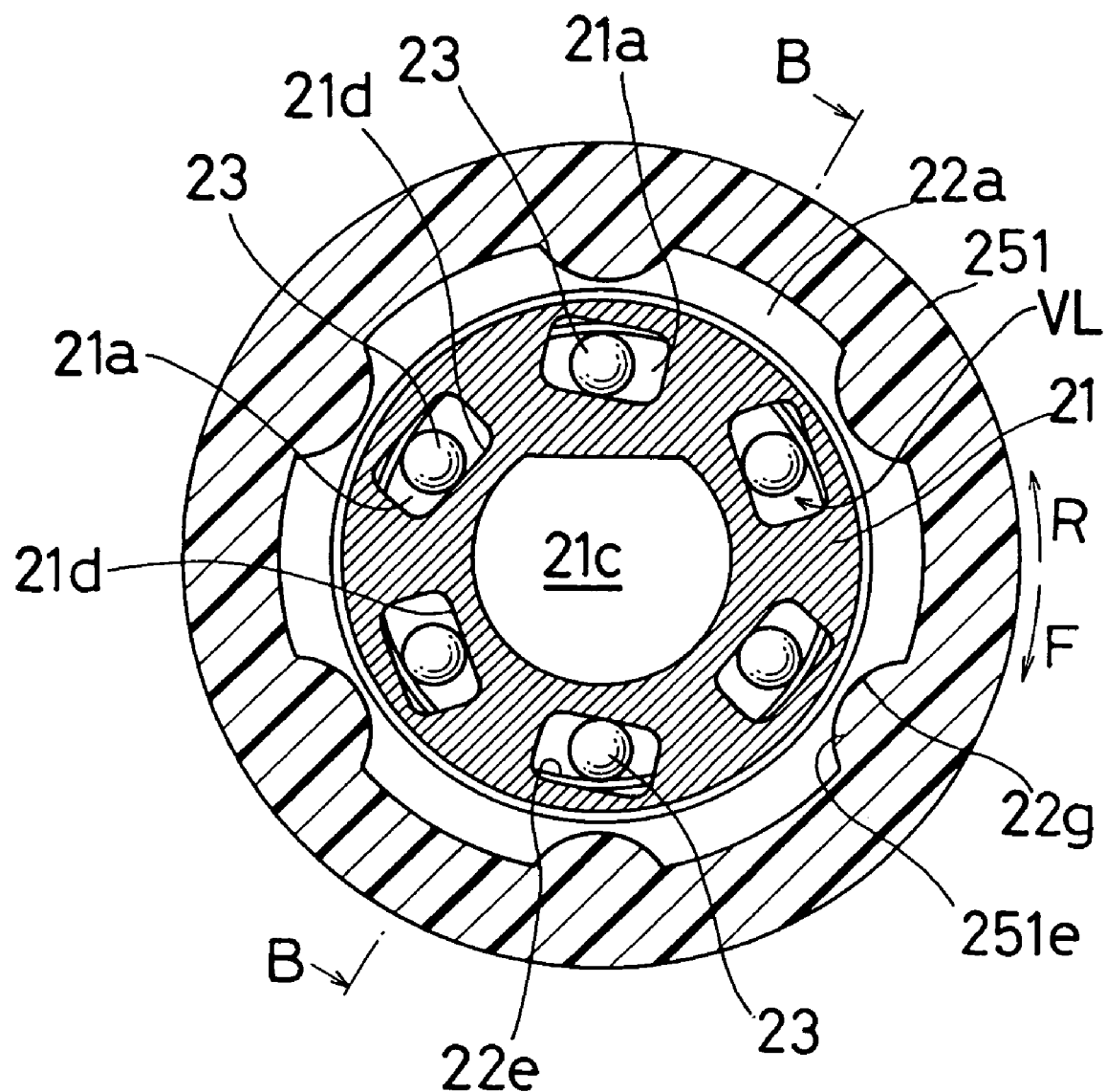
FIG. 14 is a section view taken along the line A—A of the figure.

By contrast, when the outer race 22 and the housing 25 are rotated with respect to the shaft S and the inner race 21 in the direction indicated by the arrow R in FIG. 13, in the same manner as described above, the balls 23 which are in rolling contact with the raceway surface 22e of the outer race 22 are corotated and moved by the viscosity resistance of the viscous liquid VL configured by grease or oil filled between the balls 23 and the raceway surface 22e, in the same direction as the outer race 22, i.e., the direction indicated by the arrow R. Along the direction indicated by the arrow R, the distance between the raceway surface 22e of the outer race 22 and the cam surface 21d is reduced. Therefore, the balls 23 enter between the raceway surface 22e and the cam surface 21d. In this case, therefore, the rotation of the outer race 22 is transmitted to the inner race 21 and the shaft S, thereby causing the inner race 21 and the shaft S to rotate. At this time, each of the balls 23 is in contact with the raceway surface 22e at points on both sides of the gap G, so that the power can be stably transmitted under a state where the ball is also in contact with the cam surface 21d of the inner race 21, i.e., contacted with the inner and outer races 21 and 22 at the three points in total.

In the embodiment, in the one-way clutch excluding the housing 25, the maximum width is in the portion where the raceway surface 22e of the outer race 22 is formed. The maximum width is substantially equal to a total of the diameter of the balls 23 and the thicknesses of the two outer race plates 22a, 22a, and can be largely reduced as compared with a conventional one-way clutch using rollers or sprags, in the same manner as the embodiment shown in FIG. 1 and the like. Furthermore, positioning of the one-way clutch in the axial direction can be easily performed simply by fixing the inner race 21 configured by the one plate-like annular member to the shaft S.

In the above embodiment, attention should be paid particularly on the following point. The balls 23 serving as power transmitting members are caused by using the viscosity resistance of the viscous liquid VL to corotate with the driving race, without disposing springs that urge the balls 23 in the direction along which the gap between the raceway surface 22e and the cam surface 21d is reduced, thereby enabling the embodiment to surely function as a one-way clutch. According to the configuration, it is not required to dispose springs which inevitably have a complex shape, and the cost including the assembly cost can be largely reduced.

In the embodiment described above, the housing body 252 and the cover 252 are integrated with each other by ultrasonic welding. Alternatively, they may be integrated with each other by another known method such as thermal bonding or adhesion using an adhesive agent.

The method of integrating the two outer race plates 22a, 22a is not restricted to the technique in which the plates are pushingly held between the housing body 251 and the cover 252. Another technique such as that in which the outer race plates 22a, 22a are mutually caulked in the outer peripheral portions or the like, fixed to each other by an adhesive agent, or welded to each other may be employed.

In the example described above, the ball raceway surface is formed by disposing the curved portions in radially intermediate portions of the two plates constituting the outer race. Alternatively, the curved portions may be formed in the inner edges of the plates.

Figure 20:
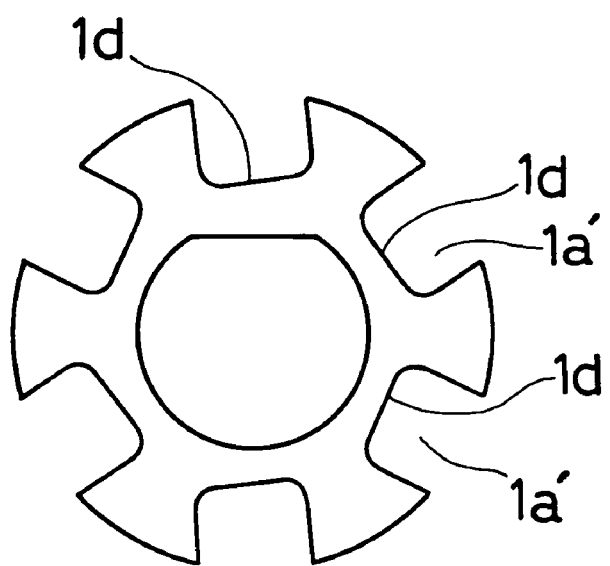
FIG. 20 is a front view showing another example of the configuration of the inner race which can be used in the embodiments shown in FIGS. 13 to 19.

In the above embodiment, the example in which the windows 21a are disposed in the inner race and the cam surface 21d is formed on the inner face of each of the windows on the side of the inner periphery of the inner race has been described. Alternatively, as shown in FIG. 20, a plurality of recesses 21a' which are formed by opening the outer perioheral sides of the windows may be formed, or in other words a plurality of recesses 21a' may be formed along the outer face of the inner race 21, and the cam surface 21*d* may be formed on the bottom face of each of the recesses 21*a'*.

Furthermore, the configuration in which viscous liquid such as grease or oil is filled between the ball raceway surface and the balls to eliminate the necessity of springs for urging the balls can be similarly applied also to the above-described configuration in which the inner race is configured by two inner race plates and the outer race is configured by one plate-like member.

As the means for urging the balls in the configuration in which the outer race is configured by two outer race plates and the inner race is configured by one plate-like member, in place of the means using the viscous liquid as in the above-described embodiment, naturally, the spring used in the embodiment shown in FIG. 1 and the like, i.e., a spring in which a plurality of elastic claws are formed integrally on an annular base member can be used.

In the invention, as the means for urging the balls, in place of the viscous liquid and the spring in which a plurality of elastic claws are formed integrally on an annular base member, a spring 31 which is configured by an annular wire member as shown in FIG. 21 may be used. When the spring 31 is used, in the case where the inner race is configured by two plates and the ball raceway surface is formed on the outer periphery, the spring force is generated in the diameter reducing direction, and the spring is placed so as to circumscribe the balls. By contrast, in the case where the outer race is configured by two plates and the ball raceway surface is formed on the inner periphery, the spring force is generated in the diameter increasing direction, and the spring is placed so as to inscribe the balls.

In both the cases, the use of the spring 31 formed by such an annular wire member enables the configuration in which the balls are urged in the direction along which the distance between the cam surface and the ball raceway surface is reduced.

Figure 23:
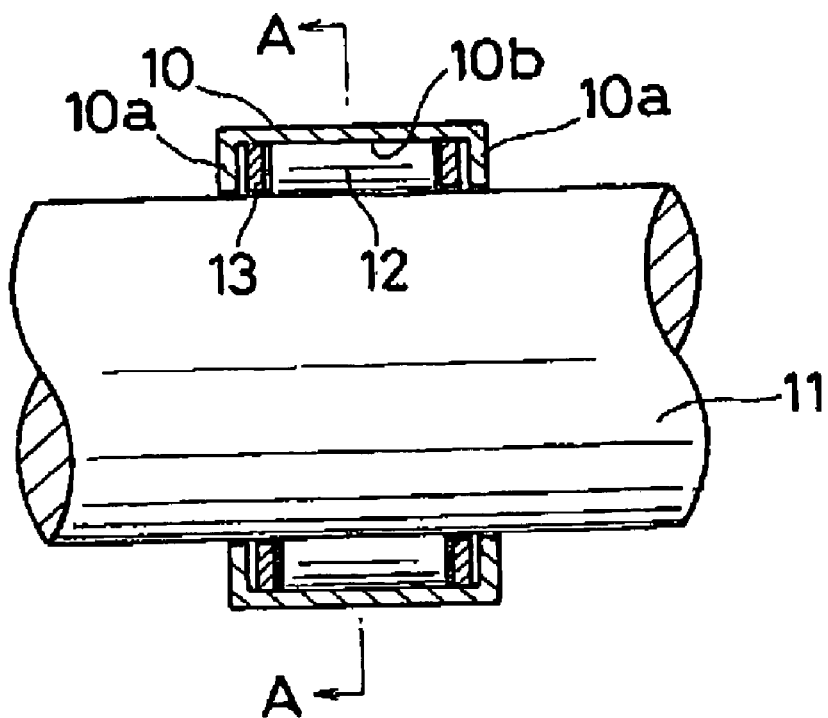
FIG. 23 is a section view taken parallel to the axis showing an example of a roller clutch which is one kind of a conventional one-way clutch.
Figure 24:
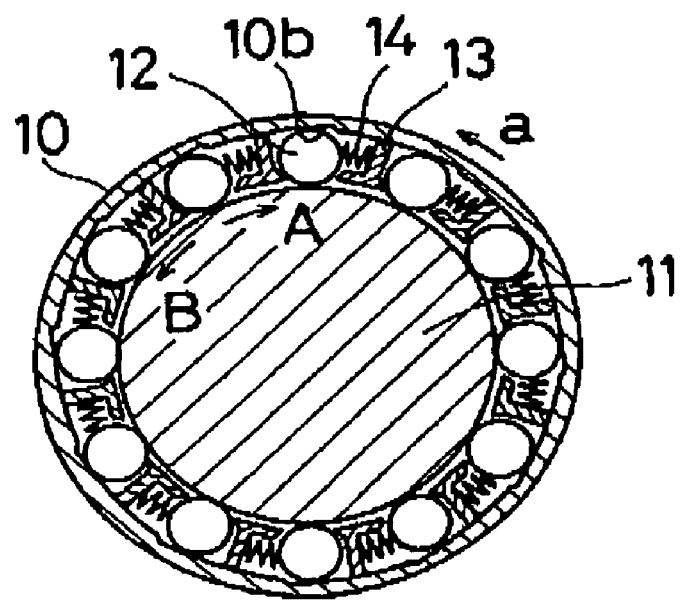
FIG. 24 is a section view taken perpendicular to the axis.
Figure 25:
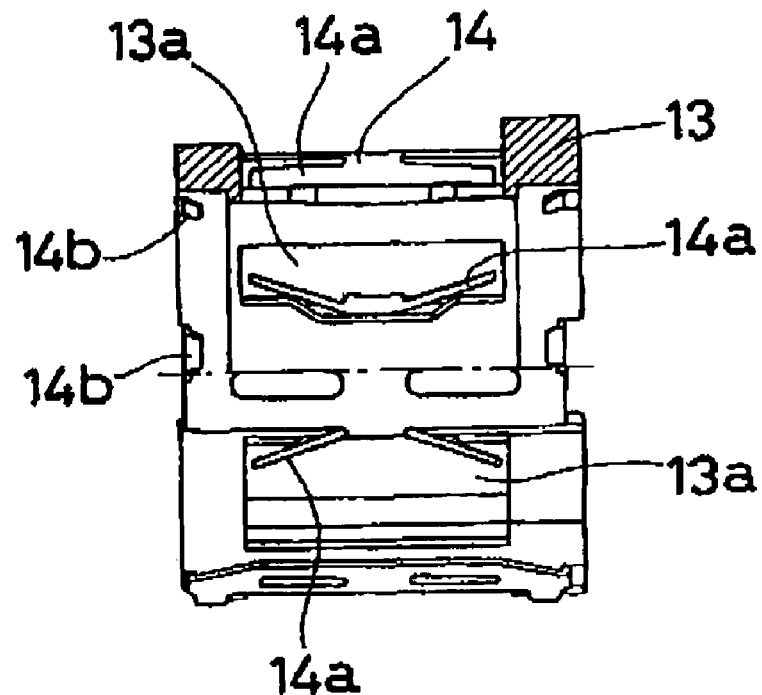
FIG. 25 is a section view taken parallel to the axis showing an example of the practical structure of a spring which is used in a conventional one-way clutch.
Figure 26:
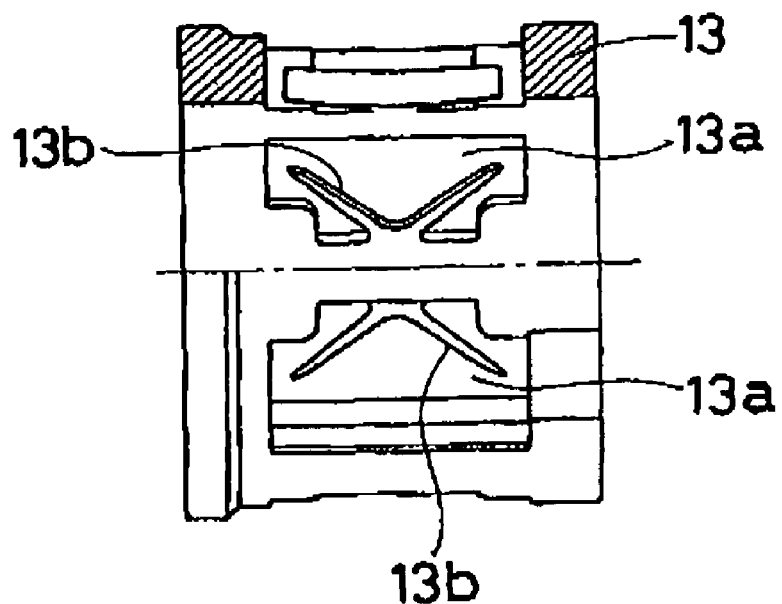
FIG. 26 is a section view taken parallel to the axis showing another example of the practical structure of a spring which is used in a conventional one-way clutch.

A preferred configuration in the case where a spring formed by such an annular wire member is used will be described by way of an example in which an inner race is configured by two plates, as shown in a section view taken parallel to the axis of FIG. 23.

In this example, springs 31 each configured by an annular wire member which generates the spring force in the diameter reducing direction are placed on both the sides of the center of the width direction of the ball raceway surface 1*f*. In a natural condition, each of the springs 31 is in a state where the diameter is increased by the balls 3. All the balls 3 are urged by the restoring force in a substantially uniform manner in the direction along which the distance between the cam surface 2*d* and the ball raceway surface 1*f* is reduced. Since the two annular wire members 31 are placed on both the sides of the ball row, the balls 3 are in a state where a pre-load is applied from the both sides of the axial direction of the one-way clutch, and hence there arises an advantage that the behavior of the balls 3 is stabilized.

The above is similarly applicable also to the case where an outer race is configured by two plates. In this case, in natural condition, springs each configured by an annular wire member which generates the spring force in the diameter increasing direction are in a state where the diameter is reduced by the balls. All the balls are urged by the restoring force in a substantially uniform manner in the direction along which the distance between the cam surface and the ball raceway surface is reduced.

The present invention may be embodied in other specific forms without departing from its spirit or essential characteristics. The described embodiments are to be considered in all respects only as illustrative and not as restrictive. The scope of the invention is, therefore, indicated by the appended claims and their combination in whole or in part rather than by the foregoing description. All changes that come within the meaning and range of equivalency of the claims are to be embraced within their scope.

The invention claimed is:

1. A one-way clutch which transmits relative rotation between inner and outer races in one direction only, and which runs idle in another direction, wherein said one-way clutch comprises:

said inner race in which two plate-like members overlay each other, a ball raceway surface is formed by curved portions that are formed in outer edges or radially intermediate portions of said plate-like members, and an air gap is formed by a step portion disposed on an inner periphery of said raceway surface;

said outer race which is configured by a plate-like member that is disposed in said air gap, between said two plate-like members of said inner race to be relatively rotatable with respect to said inner race, and in which a plurality of windows are formed in a circumferential direction;

a plurality of balls which are accommodated in said windows of said outer race, respectively; and urging means for urging said balls in a constant direction along a circumferential direction, and a cam surface is formed on an inner face of each of said windows on a side of an outer periphery of said outer race, a distance between said cam surface and said ball raceway surface of said inner race being gradually reduced in said direction.

2. A one-way clutch which transmits relative rotation between inner and outer races in one direction only, and which runs idle in another direction, wherein said one-way clutch comprises: said inner race in which two plate-like members overlay each other, a ball raceway surface is formed by curved portions that are formed in outer edges or radially intermediate portions of said plate-like members, and an air gap is formed by a step portion disposed on an inner periphery of said raceway surface;

said outer race which is configured by a plate-like member that is disposed in said air gap, between said two plate-like members of said inner race to be relatively rotatable with respect to said inner race, and in which a plurality of recesses are formed along an inner periphery;

a plurality of balls which are accommodated in said recesses of said outer race, respectively; and urging means for urging said balls in a constant direction along a circumferential direction, and a cam surface is formed on a bottom face of each of said recesses, a distance between said cam surface and said ball raceway surface of said inner race being gradually reduced in said direction.

3. A one-way clutch according to claim 1 or 2, wherein said urging means is a spring in which a plurality of claws that urge said balls in said direction, and that have elasticity are formed on an annular base member to respectively correspond to said balls.

4. A one-way clutch according to claim 3, wherein said spring is placed to overlay said outer race.

5. A one-way clutch according to claim 3, wherein said claws of said spring are bent or curved to push said balls on a center line in a width direction of said ball raceway surface of said inner race.

6. A one-way clutch according to claim 3, wherein said spring is formed by one metal plate.

7. A one-way clutch according to claim 3, wherein said spring is formed integrally by a plate-like nonmetallic elastic material.

8. A one-way clutch according to claim 1 or 2, wherein said urging means is a spring which is configured by an annular wire member, and which generates a spring force in a diameter reducing direction, and said spring is placed to circumscribe said balls, thereby urging said balls in a direction along which the distance between said cam surface and said ball raceway surface is reduced.

9. A one-way clutch according to claim 1 or 2, wherein a gap between said ball raceway surface of said inner race and said balls is filled with viscous liquid which causes said balls to co-rotate during relative rotation between said inner and outer races, and said viscous liquid functions as said urging means.

10. A one-way clutch according to claim 9, wherein said viscous liquid is grease or oil which lubricates between said ball raceway surface and said balls.

11. A one-way clutch according to claim 1 or 2, wherein said two plate-like members forming said inner race are mutually caulked to be integrated with each other.

12. A one-way clutch according to claim 10, wherein a plurality of tongue pieces are formed on an inner periphery of each of said two plate-like members forming said inner race, along a circumferential direction, each of said tongue pieces has a fastening length in the circumferential direction with respect to said tongue piece of a counter member, and said two plate-like members are mutually caulked by means of said tongue pieces.

13. A one-way clutch according to claim 12, wherein said two plate-like members have same shape and dimensions.

14. A one-way clutch according to claim 1 or 2, wherein said inner race, said outer race, said balls, and said urging means are accommodated in a housing, and, among the components, said outer race and said urging means are accommodated to be non-rotatable with respect to said housing.

15. A one-way clutch comprising:
inner and outer races, said one way clutch transmitting relative rotation between said inner and outer races in one direction only, said one way clutch running idle in another directions;
said outer race comprising two plate-like annular members overlaying each other and being integrated with each other, a ball raceway surface formed by curved portions that are formed in inner edges or radially intermediate portions of said annular members, and an air gap formed by a step portion disposed on an outer periphery of said outer raceway surface;
said inner race comprising a plate-like member disposed in said air gap, said plate-like member disposed between said two annular members of said outer race and being relatively rotatable with respect to said outer race; and a plurality of windows formed in a circumferential direction in said inner race;
a plurality of balls disposed in said windows of said inner race, respectively; and
urging means for urging said balls in a constant direction along a circumferential direction, and a cam surface formed on an inner face of each of said windows on a side of an outer periphery of said inner race, a distance between said cam surface and said ball raceway surface of said outer race being gradually reduced in said circumferential direction.

16. A one-way clutch comprising:
inner and outer races, said one-way clutch transmitting relative rotation between said inner and outer races in one direction only, and which runs idle in another direction;
said outer race comprising two plate-like annular members overlaying each other and being integrated with each other, a ball raceway surface formed by curved portions that are formed in inner edges or radially intermediate portions of said annular members, and an air gap formed by a step portion disposed on an outer periphery of said outer raceway surface;
said inner race comprising a plate-like member disposed in said air gap, said plate-like member being disposed between said two annular members of said outer race and being relatively rotatable with respect to said outer race, and a plurality of recesses formed in an outer periphery of said inner race;
a plurality of balls disposed in said recesses of said inner race, respectively; and
urging means for urging said balls in a constant direction along a circumferential direction, and a cam surface formed on a bottom face of each of said recesses, a distance between said cam surface and said ball raceway surface of said outer race being gradually reduced in said circumferential direction.

17. A one-way clutch according to claim 15 or 16, wherein said one-way clutch is accommodated in a housing configured by a housing body, and a cover fixed to said housing body, and said two plate-like annular members that form said outer race are sandwiched between said housing body and said cover to be integrated with each other.

18. A one-way clutch according to claim 14 or 15, wherein a gap between said ball raceway surface of said outer race and said balls is filled with viscous liquid which causes said balls to co-rotate during relative rotation between said outer and inner races, and said viscous liquid functions as said urging means.

19. A one-way clutch according to claim 18, wherein said viscous liquid is grease or oil which lubricates between said ball raceway surface and said balls.

20. A one-way clutch according to claim 15 or 16, wherein said urging means is a spring which is configured by an annular wire member, and which generates a spring force in a diameter increasing direction, and said spring is placed to inscribe said balls, thereby urging said balls in a direction along which the distance between said cam surface and said ball raceway surface is reduced.

21. A one-way clutch which transmits relative rotation between inner and outer races in one direction only, and which runs idle in another direction, wherein
said one-way clutch comprises: said inner race in which two plate-like members overlay each other, a ball raceway surface is formed by curved portions that are formed in outer edges or radially intermediate portions of said plate-like members;
said outer race which is configured by a plate-like member that is placed between said two plate-like members of said inner race to be relatively rotatable with respect to said inner race, and in which a plurality of windows are formed in a circumferential direction; a plurality of balls which are accommodated in said windows of said outer race, respectively; and urging means for urging said balls in a constant direction along a circumferential direction, a cam surface is formed on an inner face of each of said windows on a side of an outer periphery of said outer race, a distance between said cam surface and said ball raceway surface of said inner race being gradually reduced in said direction, and claws of said urging means are bent or curved to push said balls on a center line in a width direction of said ball raceway surface of said inner race.

22. A one-way clutch which transmits relative rotation between inner and outer races in one direction only, and which runs idle in another direction, wherein said one-way clutch comprises: said inner race in which two plate-like members overlay each other, a ball raceway surface is formed by curved portions that are formed in outer edges or radially intermediate portions of said plate-like members;

said outer race which is configured by a plate-like member that is placed between said two plate-like members of said inner race to be relatively rotatable with respect to said inner race, and in which a plurality of recesses are formed along an inner periphery; a plurality of balls which are accommodated in said recesses of said outer race, respectively; and urging means for urging said balls in a constant direction along a circumferential direction, a cam surface is formed on a bottom face of each of said recesses, a distance between said cam surface and said ball raceway surface of said inner race being gradually reduced in said direction, and claws of said urging means are bent or curved to push said balls on a center line in a width direction of said ball raceway surface of said inner race.

23. A one-way clutch which transmits relative rotation between inner and outer races in one direction only, and which runs idle in another direction, wherein said one-way clutch comprises: said inner race in which, in a state where two plate-like members in which plurality of tongue pieces are formed on an inner periphery along a circumferential direction, said tongue pieces of said plate-like members are mutually caulked, whereby said two plate-like members are integrated with each other, a ball raceway surface is formed by curved portions that are formed in outer edges or radially intermediate portions of said plate-like members;

said outer race which is configured by a plate-like member that is placed between said two plate-like members of said inner race to be relatively rotatable with respect to said inner race, and in which a plurality of windows are formed in a circumferential direction; a plurality of balls which are accommodated in said windows of said outer race, respectively; and urging means for urging said balls in a constant direction along a circumferential direction, and a cam surface is formed on an inner face of each of said windows on a side of an outer periphery of said outer race, a distance between said cam surface and said ball raceway surface of said inner race being gradually reduced in said direction.

24. A one-way clutch which transmits relative rotation between inner and outer races in one direction only, and which runs idle in another direction, wherein said one-way clutch comprises: said inner race in which, in a state where two plate-like members in which plurality of tongue pieces are formed on an inner periphery along a circumferential direction, said tongue pieces of said plate-like members are mutually caulked, whereby said two plate-like members are integrated with each other, a ball raceway surface is formed by curved portions that are formed in outer edges or radially intermediate portions of said plate-like members;

said outer race which is configured by a plate-like member that is placed between said two plate-like members of said inner race to be relatively rotatable with respect to said inner race, and in which a plurality of recesses are formed along an inner periphery; a plurality of balls which are accommodated in said recesses of said outer race, respectively; and urging means for urging said balls in a constant direction along a circumferential direction, and a cam surface is formed on a bottom face of each of said recesses, a distance between said cam surface and said ball raceway surface of said inner race being gradually reduced in said direction.

25. A one-way clutch which transmits relative rotation between inner and outer races in one direction only, and which runs idle in another direction, wherein said one-way clutch comprises: said inner race in which, in a state where two plate-like members in which plurality of tongue pieces are formed on an inner periphery along a circumferential direction, and which have same shape and dimensions, said tongue pieces of said plate-like members are mutually caulked, whereby said two plate-like members are integrated with each other, a ball raceway sur-face is formed by curved portions that are formed in outer edges or radially intermediate portions of said plate-like members;

said outer race which is configured by a plate-like member that is placed between said two plate-like members of said inner race to be relatively rotatable with respect to said inner race, and in which a plurality of windows are formed in a circumferential direction; a plurality of balls which are accommodated in said windows of said outer race, respectively; and urging means for urging said balls in a constant direction along a circumferential direction, and a cam surface is formed on an inner face of each of said windows on a side of an outer periphery of said outer race, a distance between said cam surface and said ball raceway surface of said inner race being gradually reduced in said direction.

26. A one-way clutch which transmits relative rotation between inner and outer races in one direction only, and which runs idle in another direction, wherein said one-way clutch comprises: said inner race in which, in a state where two plate-like members in which plurality of tongue pieces are formed on an inner periphery along a circumferential direction, and which have same shape and dimensions, said tongue pieces of said plate-like members are mutually caulked, whereby said two plate-like members are integrated with each other, a ball raceway sur-face is formed by curved portions that are formed in outer edges or radially intermediate portions of said plate-like members;

said outer race which is configured by a plate-like member that is placed between said two plate-like members of said inner race to be relatively rotatable with respect to said inner race, and in which a plurality of recesses are formed along an inner periphery; a plurality of balls which are accommodated in said recesses of said outer race, respectively; and urging means for urging said balls in a constant direction along a circumferential direction, and a cam surface is formed on a bottom face of each of said recesses, a distance between said cam surface and said ball raceway surface of said inner race being gradually reduced in said direction.

* * * * *